US012809332B2

(12) United States Patent
Sumida et al.

(10) Patent No.: US 12,809,332 B2
(45) Date of Patent: Nov. 24, 2026

(54) ANOMALY DIAGNOSIS APPARATUS AND ANOMALY DIAGNOSIS METHOD

(71) Applicant: Mitsubishi Electric Corporation, Tokyo (JP)

(72) Inventors: Daiki Sumida, Tokyo (JP); Naoto Takano, Tokyo (JP); Takayuki Kon, Tokyo (JP); Koichiro Ueda, Tokyo (JP); Yoichi Horisawa, Tokyo (JP); Shunichi Nishimura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 254 days.

(21) Appl. No.: 18/704,570

(22) PCT Filed: May 10, 2022

(86) PCT No.: PCT/JP2022/019769

§ 371 (c)(1),
(2) Date: Apr. 25, 2024

(87) PCT Pub. No.: WO2023/218516

PCT Pub. Date: Nov. 16, 2023

(65) Prior Publication Data

US 2024/0411283 A1 Dec. 12, 2024

(51) Int. Cl.
*G05B 19/29* (2006.01)

(52) U.S. Cl.
CPC .. *G05B 19/291* (2013.01); *G05B 2219/34013* (2013.01)

(58) Field of Classification Search
CPC ............ A61M 2205/50; G05B 19/291; G05B 2219/34013; G05B 2219/37434;
(Continued)

(56) References Cited

U.S. PATENT DOCUMENTS 7,559,405 B2 * 7/2009 Kumaido ............... B62D 5/049 180/405
2017/0242076 A1 * 8/2017 Yoshiura ............ G05B 23/0235

FOREIGN PATENT DOCUMENTS

JP 2010-249678 A 11/2010
JP 2019-024305 A 2/2019

OTHER PUBLICATIONS

International Search Report and Written Opinion mailed on Jul. 12, 2022, received for PCT Application PCT/JP2022/019769, filed on May 10, 2022, 9 pages including English Translation.

* cited by examiner

*Primary Examiner* — Antony M Paul
(74) *Attorney, Agent, or Firm* — XSENSUS LLP

(57) ABSTRACT

An anomaly diagnosis apparatus includes a command generation unit that generates a command value to specify the operation of a motor or a drive machine, a drive control unit that performs feedback control on the motor based on a control gain so that the operation of the motor or the drive machine follows the command value, a data switching unit that switches selected time-series data by selecting data from time-series data indicating the state of the motor or the drive machine, based on the result of a comparison between a control bandwidth determined from the control gain and a threshold determined from the drive machine, and an anomaly determination unit that determines an anomalous state of the motor or the drive machine, based on the selected time-series data.

13 Claims, 15 Drawing Sheets

(58) Field of Classification Search
CPC ...... G05B 19/4184; G05B 2219/31282; G05B 2219/35001; G05B 2219/37351; G05B 19/0425; G05B 19/406; G05B 23/0291; G05B 23/0283; G05B 23/0221; G05B 23/0229; G05B 19/4183; G05B 19/042; G05B 13/0265; G05B 19/102; G05B 19/0426; G05B 2219/31356; G05B 2219/37435; G05B 23/0205; G05B 2219/33331; G05B 2219/35444; H02P 29/024; H02P 1/46; H02P 6/00; H02P 6/007; H02P 6/08; H02P 6/12; H02P 6/16; H02P 6/06; H02P 21/0021; H02P 21/0025; H02P 23/08; H02P 27/08; H02P 27/085; H02P 21/05; H02P 23/28; H02P 25/026; H02P 29/028; H02P 29/0241; H02P 29/027; H02P 29/02; G06N 20/00; G06N 3/09; G06N 3/088; G06N 3/0499; G06N 5/022; G06F 18/2178; G06F 18/20; A61B 6/02; F03D 17/00; G01H 1/003; G01H 17/00; G01H 3/08
See application file for complete search history.

ANOMALY DIAGNOSIS APPARATUS AND ANOMALY DIAGNOSIS METHOD

CROSS-REFERENCE TO RELATED APPLICATION

This application is a national stage application, pursuant to 35 U.S.C. § 371, of International Patent Application No. PCT/JP2022/019769, filed May 10, 2022, the entire contents of which are incorporated herein by reference.

FIELD

The present disclosure relates to an anomaly diagnosis apparatus and an anomaly diagnosis method for diagnosing anomalies of a motor or a drive machine.

BACKGROUND

At production sites such as factories, a failure of a drive machine using a motor as a power source results in a reduction in the yield rate. To prevent the reduction in the yield rate, the production sites have used a maintenance method called time-based maintenance (TBM) in which periodic maintenance is performed on the drive machine to replace parts that have been used for specific periods of time. Recently, instead of TBM, the production sites increasingly use a maintenance method called condition-based maintenance (CBM) in which whether or not to replace parts is determined based on data collected from the drive machine (internal data of drive equipment or external sensor data from an acceleration sensor etc.). As CBM, for example, there is known a method of determining whether the drive machine is normal or anomalous by performing statistical processing, machine learning, or artificial intelligence (AI) calculation processing on the collected data.

A motor control system described in Patent Literature 1 determines a data anomaly based on a comparison between a data anomaly determination threshold and the Mahalanobis distance calculated based on time-series detected data at the time of motor driving.

CITATION LIST

Patent Literature

Patent Literature 1: Japanese Patent Application Laid-open No. 2019-024305

SUMMARY

Technical Problem

However, with the technique of Patent Literature 1, data is analyzed without selection for collected data, so that a huge amount of data including redundant data with little relevance to anomalies is analyzed, causing a problem in that the accuracy of anomaly diagnosis is reduced.

The present disclosure has been made in view of the above, and an object thereof is to provide an anomaly diagnosis apparatus capable of performing highly accurate anomaly diagnosis.

Solution to Problem

To solve the above problems and achieve an object, the anomaly diagnosis apparatus according to the present disclosure includes: a command generation unit to generate a command value to specify an operation of a motor or a drive machine driven by the motor; and a drive control unit to perform feedback control on the motor based on a control gain so that the operation of the motor or the drive machine follows the command value. Furthermore, the anomaly diagnosis apparatus includes a data switching unit to switch selected time-series data by selecting data from time-series data indicating a state of the motor or the drive machine, based on a result of a comparison between a control bandwidth determined from the control gain and a threshold determined from the drive machine; and an anomaly determination unit to determine an anomalous state of the motor or the drive machine, based on the selected time-series data.

Advantageous Effects of Invention

The anomaly diagnosis apparatus according to the present disclosure has the effect of being able to perform highly accurate anomaly diagnosis.

DESCRIPTION OF EMBODIMENTS

Hereinafter, an anomaly diagnosis apparatus and an anomaly diagnosis method according to embodiments of the present disclosure will be described in detail with reference to the drawings.

First Embodiment

Figure 1:
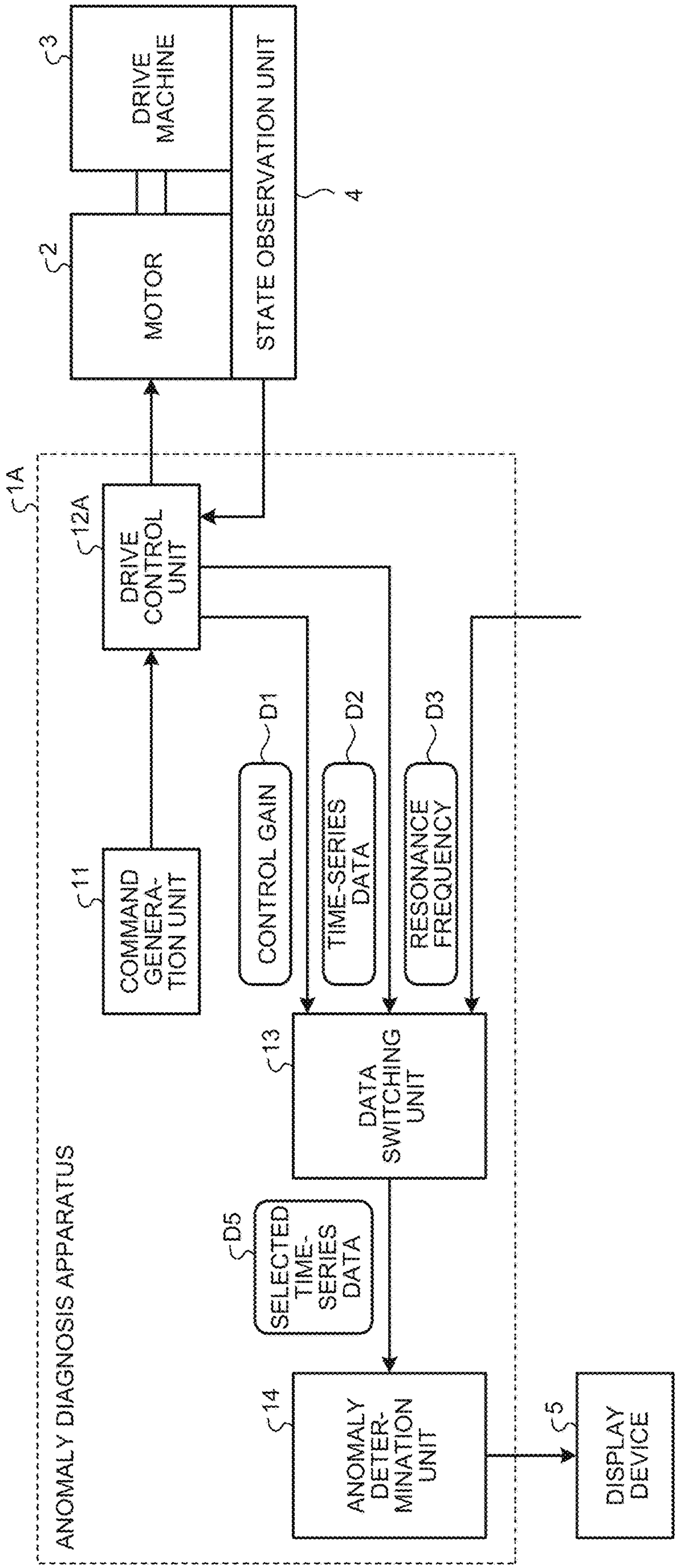
FIG. 1 is a diagram illustrating a configuration example of an anomaly diagnosis apparatus according to a first embodiment.

FIG. 1 is a diagram illustrating a configuration example of an anomaly diagnosis apparatus according to a first embodiment. An anomaly diagnosis apparatus 1A is an apparatus that diagnoses anomalies in a motor 2 or a drive machine 3. The drive machine 3 is connected to the motor 2, and operates using the motor 2 as a drive source (power source). The motor 2 and the drive machine 3 are connected to a state observation unit 4. The anomaly diagnosis apparatus 1A is connected to the state observation unit 4 and the motor 2.

The anomaly diagnosis apparatus 1A includes a command generation unit 11, a drive control unit 12A, a data switching unit 13, and an anomaly determination unit 14.

The command generation unit 11 generates a command value for causing the motor 2 and the drive machine 3 to perform a desired drive operation (a command value that specifies an operation), and outputs the generated command value to the drive control unit 12A. The drive control unit 12A supplies a drive current to the motor 2, based on a preset control gain D1 (such as a position control gain or a speed control gain to be described later) so that the operation of the motor 2 or the drive machine 3 follows the command value input from the command generation unit 11. The drive control unit 12A performs feedback control on the motor 2, based on data acquired from the state observation unit 4 and the command value input from the command generation unit 11. The drive control unit 12A outputs the control gain D1 to the data switching unit 13.

The first embodiment describes, as an example, a case where the command generation unit 11 generates a command value of a position command (a position command P1 to be described later), and the drive control unit 12A causes an actual position (an actual position P11 to be described later) to follow the position command P1, but the command value is not limited to the position command P1. That is, the command generation unit 11 may generate a command value of a speed command, and the drive control unit 12A may cause an actual speed to follow the speed command, or other processing may be performed. The position command P1 is a command for the position (such as the rotational position or movement position) of the motor 2, or a command for the drive position of the drive machine 3. The speed command is a command for the speed (such as the rotational speed or movement speed) of the motor 2, or a command for the drive speed of the drive machine 3.

The following mainly describes a case where the position command P1 is a position command to the motor 2, but the position command P1 may be a position command to the drive machine 3. The following mainly describes a case where the actual position P11 is the position of the motor 2, but the actual position P11 may be the position of the drive machine 3. The following mainly describes a case where the speed command is a speed command to the motor 2, but the speed command may be a speed command to the drive machine 3. The following mainly describes a case where the actual speed is the speed of the motor 2, but the actual speed may be the speed of the drive machine 3.

The motor 2 operates according to the drive current. The motor 2 transmits drive torque to the drive machine 3 to operate the drive machine 3. The motor 2 may be a rotary motor or a linear motor that performs a translational motion.

At least one motor 2 is connected to the drive machine 3. The drive machine 3 includes, for example, an XY table that moves in an XY plane, a mechanical part such as a ball screw, a gear, or a belt, or a parts group combining these.

The state observation unit 4 observes the state of at least one of the motor 2 and the drive machine 3, and acquires observation results as time-series data D2. In the first embodiment, the state observation unit 4 collects position data on the motor 2 and outputs the time-series data D2 of the position data to the drive control unit 12A. A specific example of the state observation unit 4 is an encoder attached to a servomotor. The state observation unit 4 is not limited to an encoder. For example, when a linear scale that can detect the displacement of the drive machine 3 is used, the linear scale also corresponds to the state observation unit 4.

Note that the state observation unit 4 may output the collected time-series data D2 to the data switching unit 13 without outputting the collected time-series data D2 to the drive control unit 12A. Alternatively, the state observation unit 4 may output some of the time-series data D2 to the drive control unit 12A, and output the remaining time-series data D2 to the data switching unit 13. In this case, the state observation unit 4 may output the time-series data D2 including the time-series data D2 to be output to the drive control unit 12A to the data switching unit 13, or may output the time-series data D2 including the time-series data D2 to be output to the data switching unit 13 to the drive control unit 12A. That is, the state observation unit 4 may output some or all of the collected time-series data D2 to the drive control unit 12A and the data switching unit 13.

The data switching unit 13 receives the time-series data D2 output from the state observation unit 4 or the drive control unit 12A. FIG. 1 illustrates a case where the data switching unit 13 receives the time-series data D2 from the drive control unit 12A.

The time-series data D2 received by the data switching unit 13 from the state observation unit 4 or the drive control unit 12A is the time-series data D2 acquired by the state observation unit 4, or processed time-series data obtained by arithmetic processing (processing) on the time-series data D2 acquired by the state observation unit 4. That is, in the first embodiment, the time-series data D2 may include processed time-series data. The arithmetic processing on the time-series data D2 is performed by the state observation unit 4 or the drive control unit 12A.

Note that the time-series data D2 is not limited to data acquired by the state observation unit 4, and may be data generated by the drive control unit 12A or data generated by the command generation unit 11. The time-series data D2 includes at least one of the data acquired by the state observation unit 4 (first data), the data generated by the drive control unit 12A (second data), and the data generated by the command generation unit 11 (third data).

The processed time-series data is time-series data obtained by performing four basic arithmetic operations, a differentiation operation, an integration operation, filtering, or processing combining them on the time-series data D2.

For example, a position deviation, a disturbance torque estimate value that is an estimate value of a disturbance torque on the motor 2 or the drive machine 3, or the like corresponds to the processed time-series data. The position deviation is a difference between the position command P1 corresponding to the actual position P11 and the actual position P11, and is obtained by subtracting the actual position P11 from the position command P1.

The resonance frequency (information on the resonance frequency) D3 of the drive machine 3 is input to the data switching unit 13 in advance. The data switching unit 13 receives the resonance frequency D3 of the drive machine 3 from a device for measuring the resonance frequency D3, or the like. The resonance frequency D3 of the drive machine 3 is measured by performing sine sweep vibration on the drive machine 3 in advance, or by performing an impact test on the drive machine 3 in advance. The measured resonance frequency D3 is input to the anomaly diagnosis apparatus 1A as input data to the data switching unit 13.

The data switching unit 13 calculates a threshold determined from the drive machine 3, based on the resonance frequency D3. This threshold is a threshold to be compared with a control bandwidth (e.g., a speed control bandwidth).

Since the resonance frequency D3 depends on the drive machine 3, the threshold calculated based on the resonance frequency D3 depends on the drive machine 3. That is, the threshold is a value determined from the drive machine 3. The data switching unit 13 switches time-series data to be output to the anomaly determination unit 14 (selected time-series data D5), based on the acquired control gain D1, the acquired time-series data D2, and the threshold determined from the drive machine 3.

Specifically, the data switching unit 13 calculates the control bandwidth based on the control gain D1. When the control gain D1 is the speed control gain, the data switching unit 13 calculates the speed control bandwidth based on the speed control gain.

For example, the data switching unit 13 selects the actual position P11 as the type of the selected time-series data D5 when the speed control bandwidth is lower than the threshold, and selects the actual current of the motor 2 as the type of the selected time-series data D5 when the speed control bandwidth is higher than the threshold. The actual position P11 is the actual position of the motor 2 or the drive machine 3. The selected time-series data D5 is time-series data selected from the time-series data D2 and output by the data switching unit 13. The data switching unit 13 outputs the selected time-series data D5 to the anomaly determination unit 14.

The anomaly determination unit 14 determines whether the motor 2 or the drive machine 3, which is a target of determination, is normal or anomalous, based on the selected time-series data D5 output from the data switching unit 13. The anomaly determination unit 14 performs the normal and anomaly determination, for example, by unsupervised learning. Unsupervised learning is a method in which only normal data (the time-series data D2 when the target of determination is normal) is used as training data, and anomaly determination is performed on the selected time-series data D5 input after learning. Examples of unsupervised learning include clustering and principal component analysis.

Note that the anomaly determination unit 14 may use supervised learning that uses the time-series data D2 with correct labels attached to training data, or may use reinforcement learning for learning actions to maximize a reward set according to the purpose, or may use other methods.

The anomaly determination unit 14 outputs the target of determination, a determination item, and a determination result to an external device such as a display device 5. The target of determination output by the anomaly determination unit 14 is the motor 2 or the drive machine 3. The determination item output by the anomaly determination unit 14 is the position deviation, the disturbance torque estimate value, or the like. The determination result output by the anomaly determination unit 14 is anomaly or normal. The display device 5 displays the target of determination, the determination item, and the determination result.

Figure 2:
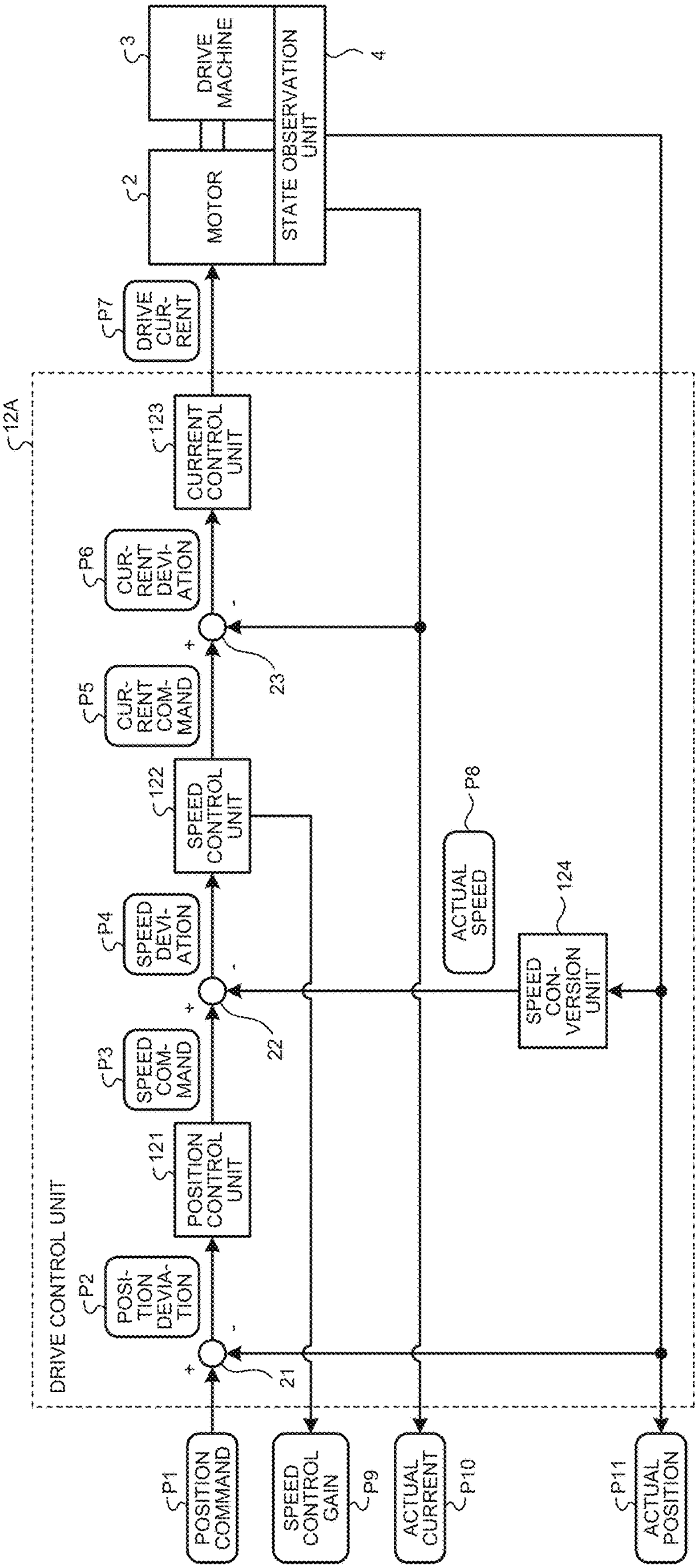
FIG. 2 is a diagram illustrating a configuration example of a drive control unit included in the anomaly diagnosis apparatus according to the first embodiment.

FIG. 2 is a diagram illustrating a configuration example of the drive control unit included in the anomaly diagnosis apparatus according to the first embodiment. The drive control unit 12A includes a subtracter 21, a position control unit 121, a subtracter 22, a speed control unit 122, a subtracter 23, a current control unit 123, and a speed conversion unit 124.

The state observation unit 4 acquires the actual position P11 and an actual current P10, as the time-series data D2, and outputs the actual position P11 and the actual current P10 to the drive control unit 12A. The actual position P11 and the actual current P10 are also sent to the data switching unit 13 via the drive control unit 12A. The actual position P11 is an actual position detected from the motor 2, and the actual current P10 is an actual current detected from the motor 2.

The subtracter 21 receives the position command P1 output from the command generation unit 11, and the actual position P11 output from the state observation unit 4. The actual position P11 is the actual position (such as the rotational position or movement position) of the motor 2, or the actual drive position of the drive machine 3. The subtracter 21 calculates a position deviation P2 by subtracting the actual position P11 from the position command P1, and outputs the calculated position deviation P2 to the position control unit 121.

The position control unit 121 calculates a speed command P3, for example, by proportional-integral-differential (PID) control, based on the position deviation P2, and outputs the speed command P3. The speed command P3 is a speed (such as rotational speed or movement speed) command to the motor 2, or a speed (such as drive speed) command to the drive machine 3. The PID control has the control gain D1. In the first embodiment, the control gain D1 of the position control unit 121 is referred to as a position control gain. The position control unit 121 outputs the speed command P3 to the subtracter 22.

The speed conversion unit 124 calculates an actual speed P8, for example, by performing time differential processing on the actual position P11 output by the state observation unit 4. The speed conversion unit 124 outputs the actual speed P8 to the subtracter 22. The actual speed P8 is the actual speed (such as the rotational speed or movement speed) of the motor 2, or the actual drive speed of the drive machine 3.

The subtracter 22 receives the speed command P3 output from the position control unit 121 and the actual speed P8 output from the speed conversion unit 124. The subtracter 22 subtracts the actual speed P8 from the speed command P3 to calculate a speed deviation P4 that is a difference between the speed command P3 and the actual speed P8. The subtracter 22 outputs the calculated speed deviation P4 to the speed control unit 122.

The speed control unit 122 calculates a current command P5, for example, by PID control based on the speed deviation P4, and outputs the current command P5. The current command P5 is a command value of current for operating the motor 2. As described above, the PID control has the control gain D1. In the first embodiment, the control gain D1 of the speed control unit 122 is referred to as a speed control gain P9. The speed control gain P9 is an example of the control gain D1 described above. The first embodiment mainly describes a case where the control gain D1 is the speed control gain P9. The speed control unit 122 outputs the current command P5 to the subtracter 23. The speed control unit 122 outputs the speed control gain P9 to the data switching unit 13.

The subtracter 23 receives the current command P5 output from the speed control unit 122 and the actual current P10 output from the state observation unit 4. The actual current P10 is an actual current value when the motor 2 is operated. The subtracter 23 subtracts the actual current P10 from the current command P5 so as to calculate a current deviation P6 that is a difference between the current command P5 and the actual current P10. The subtracter 23 outputs the calculated current deviation P6 to the current control unit 123.

The current control unit 123 calculates a drive current P7 by power conversion based on the current deviation P6 and outputs the drive current P7, thereby supplying power to the motor 2. Here, the PID control is cited as an example in the description of the control of the position control unit 121 and the speed control unit 122, but the control is not limited to the PID control. At least one of the position control unit 121 and the speed control unit 122 may perform control using PI control, P control, or feedforward compensation in combination.

Figure 3:
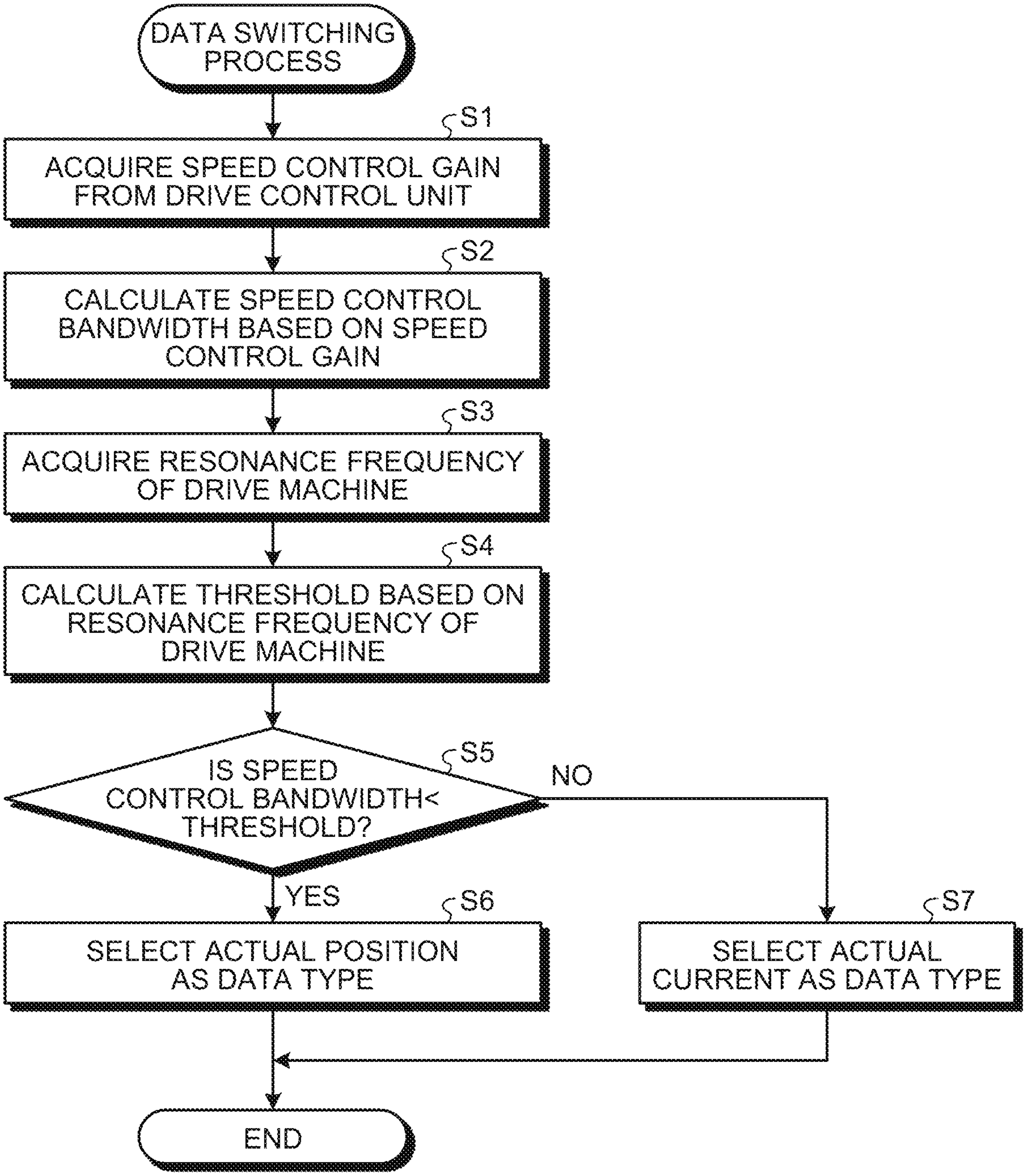
FIG. 3 is a flowchart illustrating a procedure of a process performed by a data switching unit included in the anomaly diagnosis apparatus according to the first embodiment.

Here, a detailed operation of the data switching unit 13 will be described. FIG. 3 is a flowchart illustrating a procedure of a process performed by the data switching unit included in the anomaly diagnosis apparatus according to the first embodiment.

The data switching unit 13 acquires the speed control gain P9 set in the drive control unit 12A, which is drive equipment, from the drive control unit 12A (step S1). The data switching unit 13 calculates the speed control bandwidth based on the speed control gain P9 (step S2).

Here, an example of calculating the control bandwidth from the control gain D1 will be described. Here, a description is given of a processing example of a process of calculating the speed control bandwidth, which is an example of the control bandwidth, from the speed control gain P9, which is an example of the control gain D1.

Figure 4:
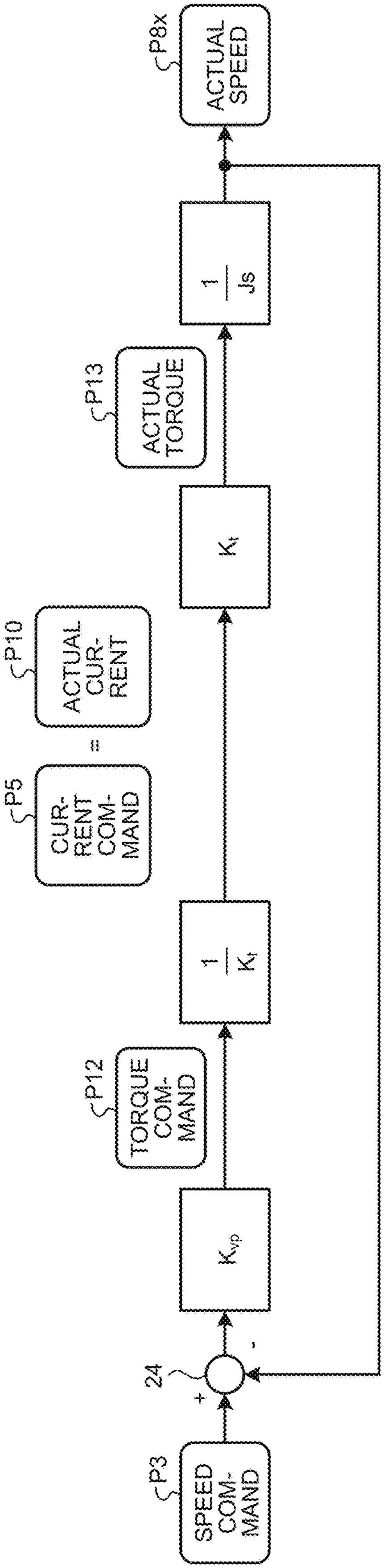
FIG. 4 is a diagram for explaining a process of calculating a control bandwidth from a control gain by the anomaly diagnosis apparatus according to the first embodiment.

FIG. 4 is a diagram for explaining the process of calculating the control bandwidth from the control gain by the anomaly diagnosis apparatus according to the first embodiment. FIG. 4 illustrates a block configuration focusing on transfer characteristics of the motor 2, the drive machine 3, the state observation unit 4, and the drive control unit 12A. FIG. 4 illustrates a case where the drive control unit 12A performs proportional control.

In FIG. 4, the motor 2 and the drive machine 3 are regarded as rigid bodies, and J is the sum of the inertia of the motor 2 and the inertia of the drive machine 3. s is the Laplace operator. $K_{vp}$ is the speed control gain, and $K_t$ is a constant for conversion from current to torque.

In FIG. 4, the control bandwidth of the current control unit 123 is regarded as much higher than the control bandwidth of the speed control unit 122 and direct, and the current command P5=the actual current P10. That is, FIG. 4 illustrates a case where the speed command P3 output from the position control unit 121 is input to the speed control unit 122, the current command P5 output from the speed control unit 122 (the actual current P10) is input to the motor 2, and the current control unit 123 is omitted.

The speed command P3 from the command generation unit 11 and an actual speed P8$x$ detected at the motor 2 are input to a subtracter 24. The subtracter 24 calculates the speed deviation P4 by subtracting the actual speed P8$x$ from the speed command P3, and outputs the calculated speed deviation P4 to the speed control unit 122.

The speed deviation P4 is affected by $K_{vp}$ in the speed control unit 122 to be a torque command P12. The torque command P12 is affected by $1/K_t$ in the speed control unit 122 to be the current command P5. The current command P5 is affected by $K_t$ in the motor 2 to be an actual torque P13. The actual torque P13 is affected by 1/Js in the motor 2 to be the actual speed P8$x$. The actual speed P8$x$ is sent to the speed control unit 122. The speed control unit 122 performs control using the actual speed P8$x$, thereby achieving a feedback loop. In this case, a closed-loop transfer function G(s) from the speed command P3 to the actual speed P8$x$ is expressed by formula (1) below, and is a first-order lag transfer function.

Formula 1

$$G(s) = \frac{\frac{K_{vp}}{J}}{s + \frac{K_{vp}}{J}} \tag{1}$$

Therefore, the transfer function from the speed command P3 to the actual speed P8$x$ has a first-order lag characteristic determined by a frequency $\omega_{sc}$ shown in formula (2) below, and has a characteristic of passing a frequency of approximately $\omega_{sc}$ or lower but sampling frequencies higher than $\omega_{sc}$.

Formula 2

$$\omega_{sc} = \frac{K_{vp}}{J} \tag{2}$$

$\omega_{sc}$ is the speed control bandwidth, and can be calculated from the speed control gain $K_{vp}$ by formulas (1) and (2) above. Although the case of performing proportional control has been described as an example in FIG. 4, even by PI control or PID control, the speed control bandwidth can be calculated likewise if its proportional gain is regarded as $K_{vp}$.

Next, the data switching unit 13 acquires the resonance frequency D3 of the drive machine 3 (step S3). The data switching unit 13 stores the resonance frequency D3 measured in advance, and acquires the resonance frequency D3 by reading the stored resonance frequency D3. The resonance frequency D3 may be stored outside the data switching unit 13.

Next, the data switching unit 13 calculates the threshold based on the resonance frequency D3 of the drive machine 3 (step S4). For example, the data switching unit 13 sets the threshold=the resonance frequency D3, or the threshold=the resonance frequency D3×c. Here, c is, for example, in the range of about 0.5≤c≤2.

Next, the data switching unit 13 compares the speed control bandwidth with the threshold, and determines whether or not the speed control bandwidth<the threshold (step S5). That is, the data switching unit 13 determines whether or not the speed control bandwidth is lower than the threshold.

When determining that the speed control bandwidth is lower than the threshold (step S5, Yes), the data switching unit 13 selects the actual position P11 as the data type (step S6), and outputs the actual position P11 to the anomaly determination unit 14. That is, the data switching unit 13 selects the actual position P11 from the time-series data D2, and outputs the selected actual position P11 to the anomaly determination unit 14 as the selected time-series data D5.

On the other hand, when determining that the speed control bandwidth is higher than the threshold (step S5, No), the data switching unit 13 selects the actual current P10 as the data type (step S7), and outputs the actual current P10 to the anomaly determination unit 14. That is, the data switching unit 13 selects the actual current P10 from the time-series data D2, and outputs the selected actual current P10 to the anomaly determination unit 14 as the selected time-series data D5.

Here, a description has been given of the example in which the selected data is the actual current P10 or the actual position P11. However, the actual current P10 may be replaced with the current command P5 for driving the motor 2, the torque command P12 for driving the motor 2 or the drive machine 3, the actual torque P13 detected from the motor 2 or the drive machine 3, the disturbance torque estimate value that is an estimate value of a disturbance torque on the motor 2 or the drive machine 3, the current deviation P6, or a torque deviation (a difference between the torque command P12 to the motor 2 and the actual torque P13). The actual position P11 may be replaced with the speed command P3 to the motor 2 or the drive machine 3, the actual speed P8 of the motor 2 or the drive machine 3, the acceleration of the motor 2 or the drive machine 3, the position deviation P2 of the motor 2 or the drive machine 3, or the speed deviation P4 of the motor 2 or the drive machine 3. Acceleration data on the motor 2 or the drive machine 3 includes vibration information.

That is, when the speed control bandwidth is higher than the threshold, the data switching unit 13 selects the selected time-series data D5 to be output to the anomaly determination unit 14 from a first data group of the time-series data D2. On the other hand, when the speed control bandwidth is lower than the threshold, the data switching unit 13 selects the selected time-series data D5 to be output to the anomaly determination unit 14 from a second data group of the time-series data D2.

The first data group includes the actual current P10, the current command P5, the torque command P12, the actual torque P13, the disturbance torque estimate value, the current deviation P6, or the torque deviation. The second data group includes the actual position P11, the speed command P3, the actual speed P8, the acceleration, the position deviation P2, or the speed deviation P4.

When the speed control bandwidth is higher than the threshold, the data switching unit 13 may select one piece of data or a plurality of pieces of data from the first data group. When the speed control bandwidth is lower than the threshold, the data switching unit 13 may select one piece of data or a plurality of pieces of data from the second data group.

Figure 5:
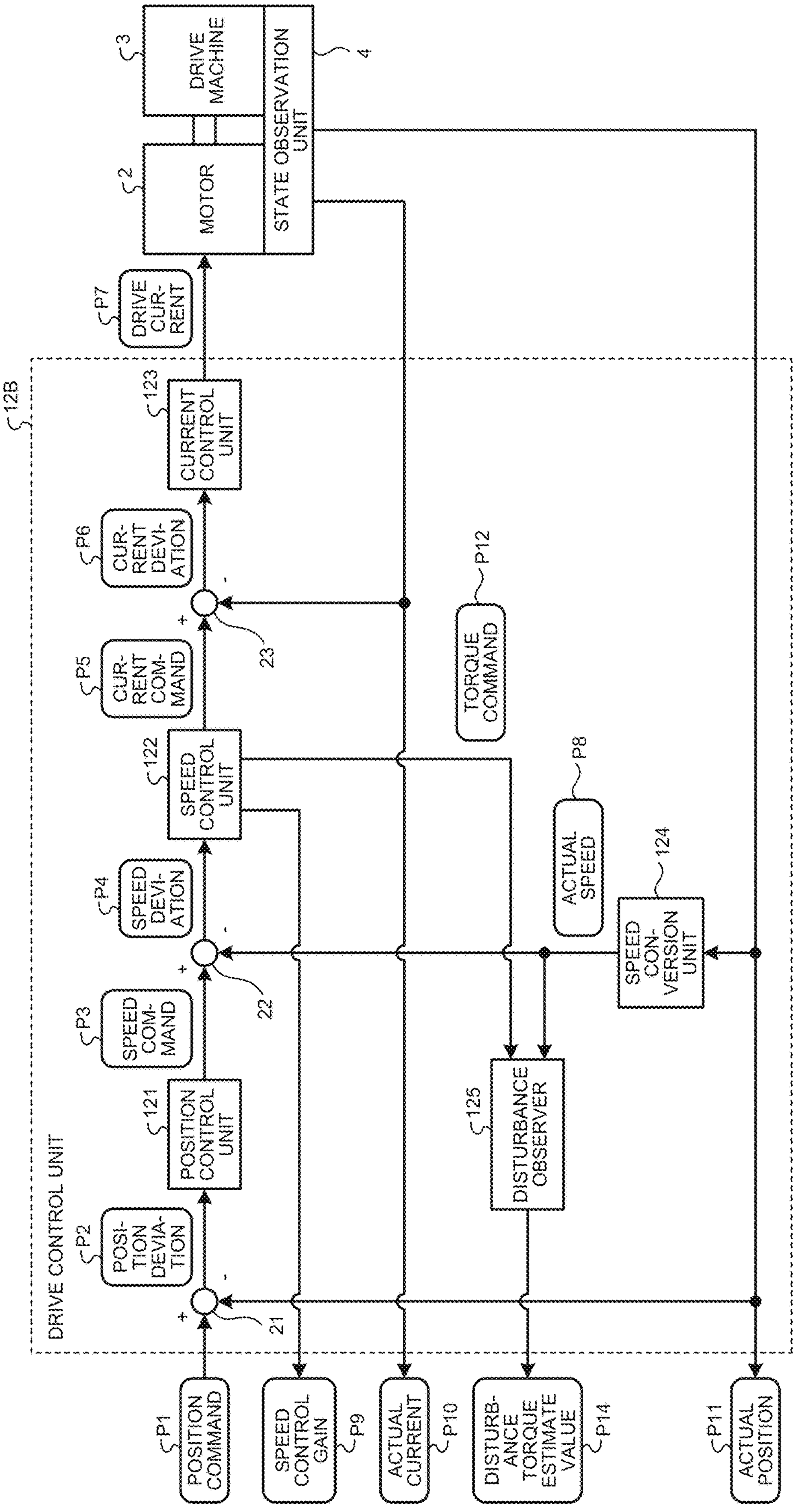
FIG. 5 is a diagram illustrating another configuration example of a drive control unit included in the anomaly diagnosis apparatus according to the first embodiment.

Here, a configuration of a drive control unit when calculating a disturbance torque estimate value will be described. FIG. 5 is a diagram illustrating another configuration example of a drive control unit included in the anomaly diagnosis apparatus according to the first embodiment. FIG. 5 illustrates the configuration of a drive control unit 12B that estimates a disturbance torque estimate value P14. The drive control unit 12B includes a disturbance observer 125 in addition to the components included in the drive control unit 12A. The disturbance observer 125 is connected to the speed conversion unit 124 and the speed control unit 122.

In the drive control unit 12B, the speed control unit 122 calculates the torque command P12 corresponding to the current command P5. Specifically, the speed control unit 122 calculates the torque command P12 by multiplying the current command P5 by the torque constant of the motor 2 (the conversion constant $K_t$). The speed control unit 122 outputs the calculated torque command P12 to the disturbance observer 125. The speed conversion unit 124 outputs the calculated actual speed P8 to the subtracter 22 and the disturbance observer 125.

The disturbance observer 125 calculates the disturbance torque estimate value P14 based on the torque command P12 and the actual speed P8. Specifically, the disturbance observer 125 calculates the disturbance torque estimate value P14 by subtracting, from the torque command P12, data obtained by multiplying data obtained by differentiating the actual speed P8 by the total value of the inertia of the motor 2 and the inertia of the drive machine 3. The disturbance observer 125 outputs the calculated disturbance torque estimate value P14 to the data switching unit 13.

As described above, the anomaly diagnosis apparatus 1A for the motor 2 or the drive machine 3 selects data in which anomalies are likely to appear (the selected time-series data D5), based on the relationship between a physical feature (the resonance frequency D3) of the drive machine 3 or the motor 2 and the control bandwidth, and performs anomaly diagnosis on the motor 2 or the drive machine 3 based on the selected data. Consequently, the anomaly diagnosis apparatus 1A can reduce or prevent an increase in calculation load, and can reduce or prevent a decrease in the accuracy of anomaly diagnosis since redundant data (data with little relevance to anomalies) is not used. Furthermore, the anomaly diagnosis apparatus 1A does not require expertise and time to select data when performing anomaly diagnosis on the motor 2 or the drive machine 3. Thus, the anomaly diagnosis apparatus 1A can perform anomaly diagnosis on the motor 2 or the drive machine 3 easily with high accuracy.

Here, the reason why the anomaly diagnosis apparatus 1A can perform anomaly diagnosis on the motor 2 or the drive machine 3 easily with high accuracy will be described in detail. When some anomaly occurs in the drive machine 3, the effect of the anomaly acts on the motor 2 as a disturbance, appearing in at least one of the actual current P10 and the actual position P11 output by the state observation unit 4. That is, when an anomaly occurs in the drive machine 3, at least one of the actual current P10 and the actual position P11 output by the state observation unit 4 shows an anomalous numerical value. When an anomaly occurs in the drive machine 3, for example, micro vibration having the resonance frequency D3 of the drive machine 3 or a frequency near the resonance frequency D3 occurs, acting on the motor 2 as a disturbance.

When the drive control unit 12A creates a feedback loop to control the motor 2, whether or not a disturbance of a specific frequency is easily suppressed is determined, depending on the control bandwidth determined from the control gain D1. In the drive control unit 12A, for example, the higher the control bandwidth, the wider the range of frequencies that can be suppressed.

For example, when the frequency of a disturbance is lower than the speed control bandwidth, the effect of the disturbance is unlikely to appear in the actual position P11, which is a controlled variable. However, this does not mean that the effect does not appear at all in the actual position P11, and a frequency caused by disturbance vibration appears slightly though. When the control bandwidth is higher than the frequency of disturbance vibration, the control gain D1 corresponding to the control bandwidth also increases.

When creating a feedback loop, the drive control unit 12A multiplies the deviation between command data such as the position command P1 or the speed command P3 and a controlled variable such as the actual position P11 or the actual speed P8 by the control gain D1 to calculate a manipulated variable. In the anomaly diagnosis apparatus 1A, when the control gain D1 is large, the actual position P11 or the actual speed P8 slightly including the frequency component of a disturbance is increased, so that the frequency of the disturbance is likely to appear in the current command P5, which is the manipulated variable.

On the other hand, when the frequency of a disturbance is higher than the speed control bandwidth, the drive control unit 12A cannot completely remove the effect of the disturbance even when the feedback loop is created, and the effect of the disturbance is likely to appear in the controlled variable. Consequently, the frequency of the disturbance is likely to appear in the actual position P11, which is the controlled variable.

The torque command P12, which is the manipulated variable, has a weak function to cancel out a disturbance by the feedback loop. Thus, the torque command P12 has a characteristic that the frequency of a disturbance is unlikely to appear.

Therefore, the anomaly diagnosis apparatus 1A of the first embodiment compares the control bandwidth determined from the control gain D1 with the threshold calculated based on the resonance frequency D3 determined from the drive machine 3, and automatically selects data that facilitates the excitation of the frequency of a disturbance associated with an anomaly (the selected time-series data D5), based on the comparison result. Then, the anomaly determination unit 14 of the anomaly diagnosis apparatus 1A determines an anomaly in the drive machine 3 or the motor 2, based on the selected time-series data D5 selected, and thus can accurately detect an anomaly.

Instead of the actual current P10, the data switching unit 13 may select the current command P5, the torque command P12 having a proportional relationship with the current command P5, the actual torque P13, the current deviation P6 obtained by subtracting the actual current P10 from the current command P5, the torque deviation obtained by subtracting the actual torque P13 from the torque command P12, or the disturbance torque estimate value P14. In this case, the frequency component of the resonance frequency D3 superimposed on the actual current P10 is also superimposed on various types of processed data calculated from the actual current P10 or data selected instead of the actual current P10, so that the anomaly diagnosis apparatus 1A can obtain the same effects as those when the actual current P10 is selected.

Instead of the actual position P11, the data switching unit 13 may select the actual speed P8 obtained by differentiating the actual position P11 or the acceleration obtained by differentiating the actual position P11 twice, the position deviation P2 obtained by subtracting the actual position P11 from the position command P1, or the speed deviation P4 obtained by subtracting the actual speed P8 from the speed command P3. In this case, the frequency component of the resonance frequency D3 superimposed on the actual position P11 is also superimposed on various types of processed data calculated from the actual position P11 or data selected instead of the actual position P11, so that the anomaly diagnosis apparatus 1A can obtain the same effects as those when the actual position P11 is selected.

Although the first embodiment has described the case where the threshold determined from the drive machine 3 is the resonance frequency D3, the threshold is not limited to the resonance frequency D3. For example, depending on the drive machine 3, the resonance frequency D3 may vary depending on operating conditions, and the threshold may slightly vary from the resonance frequency D3, depending on the setting of the control gain D1. Therefore, as described above, the anomaly diagnosis apparatus 1A may set a value obtained by multiplying the resonance frequency D3 of the drive machine 3 by a specific constant c (e.g., about $0.5 \leq c \leq 2$) as the threshold determined from the drive machine 3.

Note that the control bandwidth is not limited to the speed control bandwidth and may be a position control bandwidth or a current (torque) control bandwidth. When the control bandwidth is the position control bandwidth or the current (torque) control bandwidth, the data switching unit 13 calculates the threshold based on the resonance frequency D3.

As described above, in the first embodiment, the anomaly diagnosis apparatus 1A switches the selected time-series data D5, which is time-series data to be selected and output out of the time-series data D2 indicating the state of the motor 2 or the drive machine 3, based on the result of a comparison between the control bandwidth determined from the control gain D1 and the threshold determined from the drive machine 3. Then, the anomaly diagnosis apparatus 1A determines an anomalous state of the motor 2 or the drive machine 3, based on the selected time-series data D5. Thus, the anomaly diagnosis apparatus 1A can select collected data and then analyze the data, and consequently can determine an anomalous state with a small amount of data that does not include redundant data with little relevance to anomalies. Therefore, the anomaly diagnosis apparatus 1A can perform highly accurate anomaly diagnosis. In addition, the anomaly diagnosis apparatus 1A can perform anomaly diagnosis in a short time.

Second Embodiment

Next, a second embodiment will be described with reference to FIGS. 6 to 8. In the second embodiment, of the selected time-series data D5 on which a disturbance associated with an anomaly is likely to be superimposed, data when an operating state of the motor 2 or the drive machine 3 is an acceleration section or a deceleration section is selected as data more advantageous for anomaly determination, to perform anomaly diagnosis.

Figure 6:
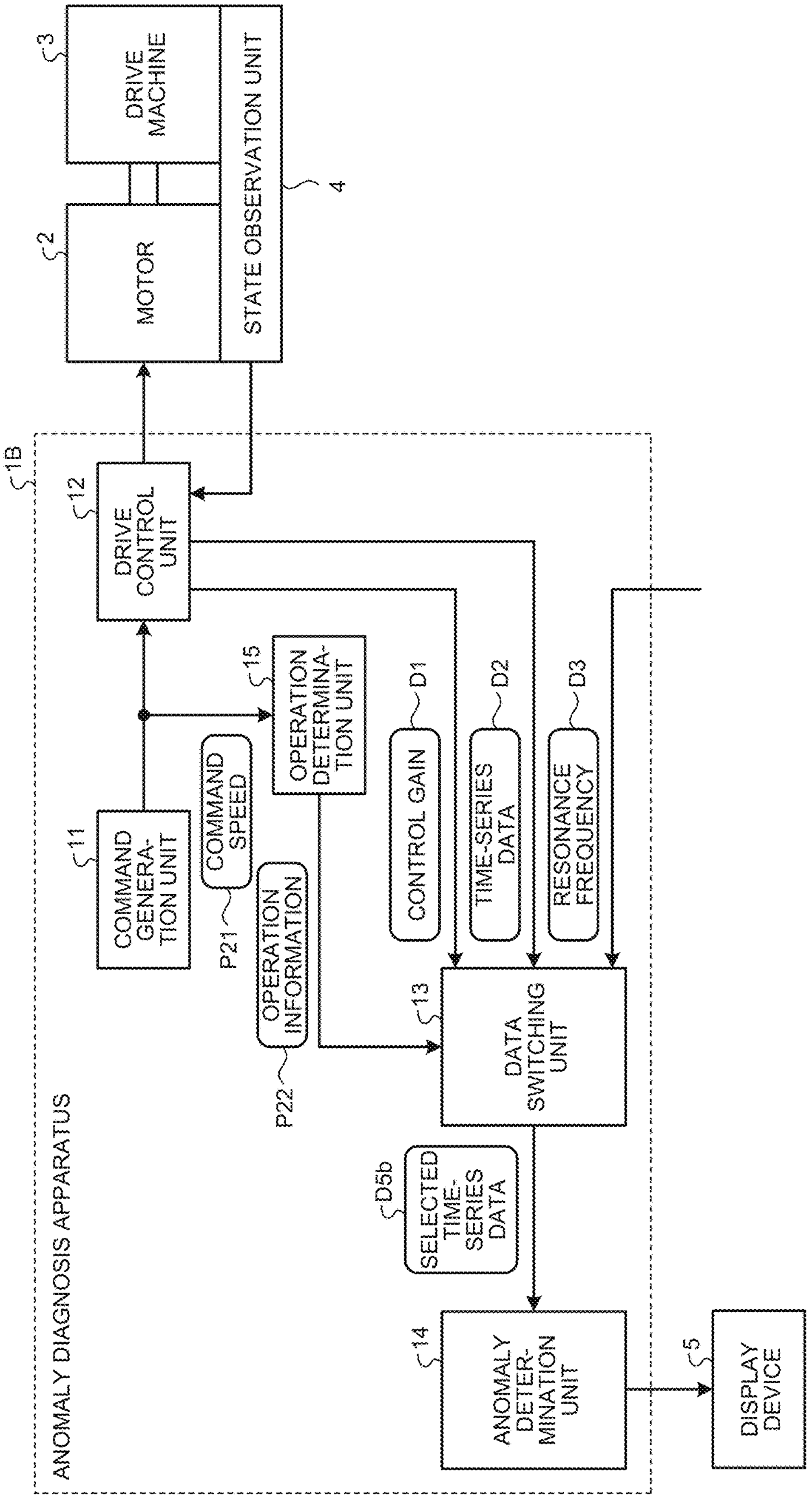
FIG. 6 is a diagram illustrating a configuration example of an anomaly diagnosis apparatus according to a second embodiment.

FIG. 6 is a diagram illustrating a configuration example of an anomaly diagnosis apparatus according to the second embodiment. Of the components in FIG. 6, components that achieve the same functions as those of the anomaly diagnosis apparatus 1A of the first embodiment illustrated in FIG. 1 are denoted by the same reference numerals without duplicated descriptions.

An anomaly diagnosis apparatus 1B of the second embodiment includes an operation determination unit 15 in addition to the components included in the anomaly diagnosis apparatus 1A. The operation determination unit 15 is connected to the command generation unit 11 and the data switching unit 13.

The operation determination unit 15 receives, for example, a command value generated and output by the command generation unit 11. The operation determination unit 15 determines the operating state of the motor 2 or the drive machine 3 based on, for example, the command value generated by the command generation unit 11. Specifically, when the command generation unit 11 generates the position command P1, the operation determination unit 15 calculates a command speed P21 by differentiating the position command P1, and determines the operating state of the motor 2 or the drive machine 3 based on the calculated command speed P21. The operation determination unit 15 outputs operation information P22 indicating the operating state to the data switching unit 13.

Here, an example of the command speed P21 will be described. FIG. 7 is a diagram illustrating an example of the command speed used by the anomaly diagnosis apparatus according to the second embodiment. The horizontal axis of a graph illustrated in FIG. 7 is time, and the vertical axis is the command speed P21.

Figure 7:
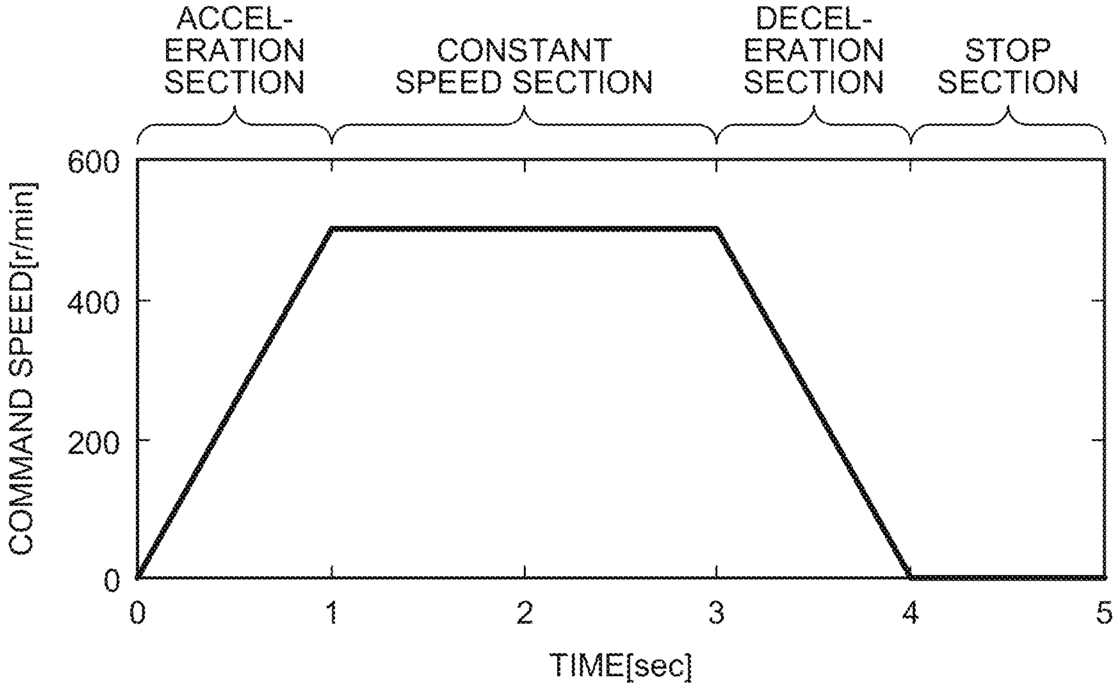
FIG. 7 is a diagram illustrating an example of a command speed used by the anomaly diagnosis apparatus according to the second embodiment.
Figure 8:
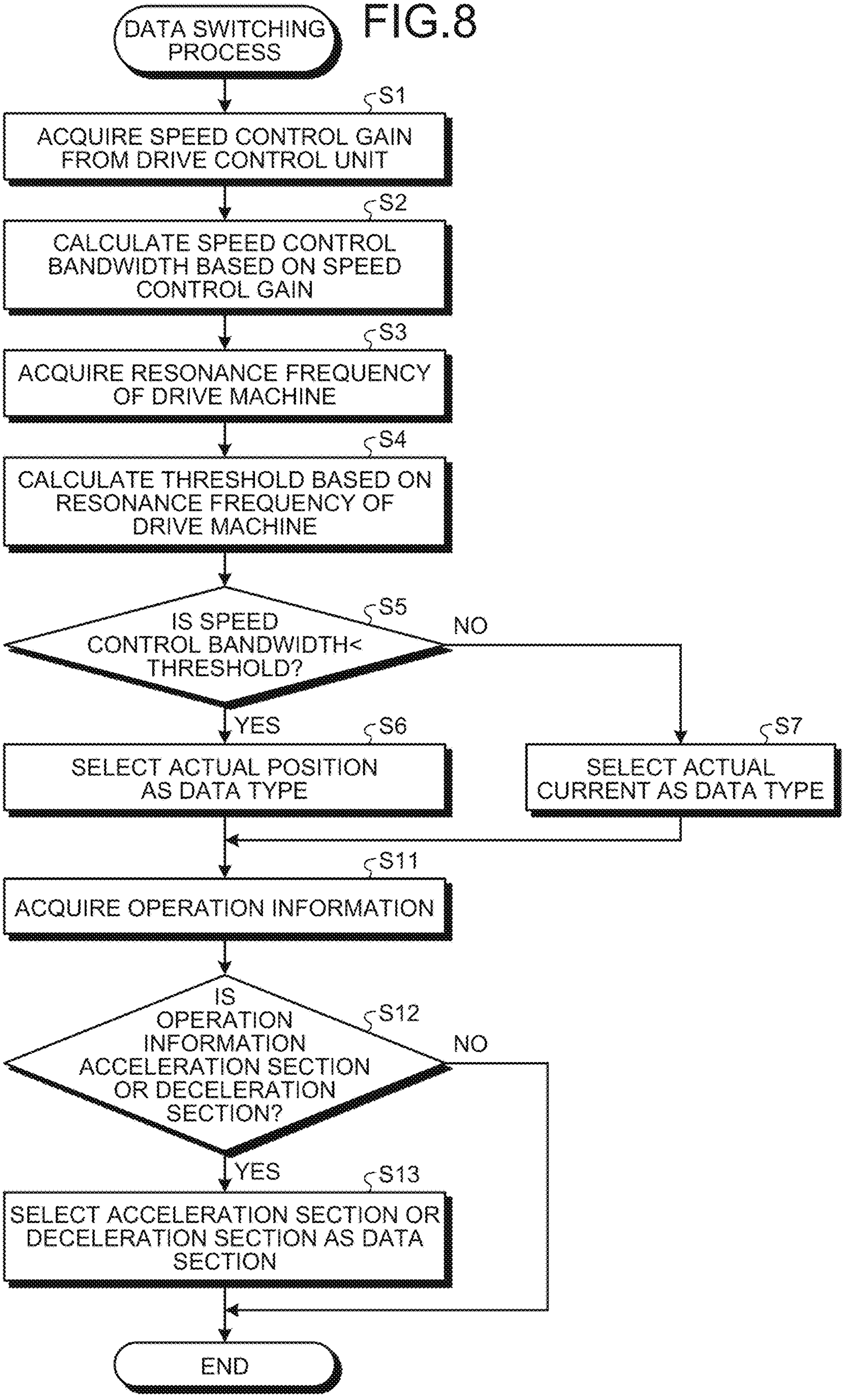
FIG. 8 is a flowchart illustrating a procedure of a process performed by a data switching unit included in the anomaly diagnosis apparatus according to the second embodiment.

As illustrated in FIG. 7, the command speed P21 is classified into an acceleration section in which the absolute value of the speed (operating speed) increases, a constant speed section in which the absolute value of the speed is a constant value higher than 0 (r/min), a deceleration section in which the absolute value of the speed decreases, and a stop section in which the command speed P21 is constant at 0 (r/min). The operation determination unit 15 determines which section the command speed P21 corresponds to at a specific time, and outputs the operation information P22, which is a determination result, to the data switching unit 13. The operation determination unit 15 outputs the operation information P22 for each time to the data switching unit 13.

Next, a detailed operation of the data switching unit 13 will be described. FIG. 8 is a flowchart illustrating a procedure of a process performed by the data switching unit included in the anomaly diagnosis apparatus according to the second embodiment. Of the processing illustrated in FIG. 8, the same processing as the processing performed by the anomaly diagnosis apparatus 1A of the first embodiment illustrated in FIG. 3 will not be described.

The anomaly diagnosis apparatus 1B of the second embodiment performs the processing in steps S1 to S7 like the anomaly diagnosis apparatus 1A. That is, in steps S1 to S7, the anomaly diagnosis apparatus 1B selects the type of data (the selected time-series data D5) based on the speed control bandwidth calculated from the speed gain and the threshold calculated from the resonance frequency D3.

The anomaly diagnosis apparatus 1B performs processing in steps S11 to S13 after steps S6 and S7. Specifically, the data switching unit 13 of the anomaly diagnosis apparatus 1B acquires the operation information P22 output from the operation determination unit 15 (step S11).

After this, the data switching unit 13 determines whether or not the operating state indicated by the operation information P22 is the acceleration section or the deceleration section (step S12). When the operating state indicated by the operation information P22 is the acceleration section or the deceleration section (step S12, Yes), the data switching unit 13 selects the acceleration section or the deceleration section as a data section to be selected from the selected time-series data D5 (step S13). Then, the data switching unit 13 samples (selects) the selected time-series data D5 including the time of the acceleration section or the deceleration section of the selected time-series data D5, and outputs the sampled selected time-series data D5 to the anomaly determination unit 14.

In step S12, when the operating state indicated by the operation information P22 is neither the acceleration section nor the deceleration section (step S12, No), the data switching unit 13 does not output the selected time-series data D5 to the anomaly determination unit 14. That is, when the operating state of the motor 2 or the drive machine 3 is neither the acceleration section nor the deceleration section, the data switching unit 13 does not output the selected time-series data D5 to the anomaly determination unit 14.

In the data switching process of the first embodiment, data selection is automatically switched so that data on which a disturbance associated with an anomaly is likely to be superimposed, that is, data advantageous for the anomaly determination unit 14 to perform anomaly determination (the selected time-series data D5) can be input to the anomaly determination unit 14.

In order to extract data more advantageous for anomaly determination, the anomaly diagnosis apparatus 1B of the second embodiment performs data section selection in addition to data type selection. In the acceleration section or the deceleration section, the motor 2 and the drive machine 3 operate sharply. Consequently, a large excitation force is applied to the motor 2 and the drive machine 3. A large excitation force tends to excite vibration, and a large vibration component tends to be included in a disturbance associated with an anomaly. Therefore, the data switching unit 13 samples only the selected time-series data D5 in the acceleration section or the deceleration section and outputs the sampled selected time-series data D5 to the anomaly determination unit 14, so that the anomaly determination unit 14 can perform anomaly determination with higher accuracy than in the first embodiment.

Although the anomaly diagnosis apparatus 1B of the second embodiment determines which of the acceleration section, the deceleration section, the constant speed section, and the stop section the operating state is, based on the command speed P21, the anomaly diagnosis apparatus 1B may determine the operating state based on data other than the command speed P21. For example, the operation determination unit 15 may determine which of the acceleration section, the deceleration section, the constant speed section, and the stop section the operating state is, based on the actual speed P8 of the motor 2 or the drive machine 3, or data obtained by filtering the command speed P21 or the actual speed P8. The operation determination unit 15 may sample only data in one of the acceleration section and the deceleration section, or may sample data in both. That is, the operation determination unit 15 samples data in at least one of the acceleration section and the deceleration section.

The second embodiment has described the motor 2 and the drive machine 3 in which a disturbance associated with an anomaly is likely to occur in the acceleration section or the deceleration section. However, there are some drive machines 3 in which a disturbance associated with an anomaly acts on a friction phenomenon. For such a drive machine 3, the anomaly diagnosis apparatus 1B can perform highly accurate anomaly diagnosis by sampling data in the constant speed section instead of in the acceleration section or the deceleration section.

As described above, according to the second embodiment, the anomaly diagnosis apparatus 1B performs anomaly diagnosis on the selected time-series data D5 in the acceleration section, the deceleration section, the constant speed section, or the stop section, so that anomaly diagnosis can be performed with higher accuracy than in the first embodiment.

Third Embodiment

Next, a third embodiment will be described with reference to FIGS. 9 to 13. The first embodiment has described the example of selecting data that is advantageous for anomaly determination using the threshold determined from the resonance frequency D3 of the drive machine 3, when some anomaly occurs in the drive machine 3. The third embodiment describes another example of the threshold calculated from the drive machine 3.

Figure 9:
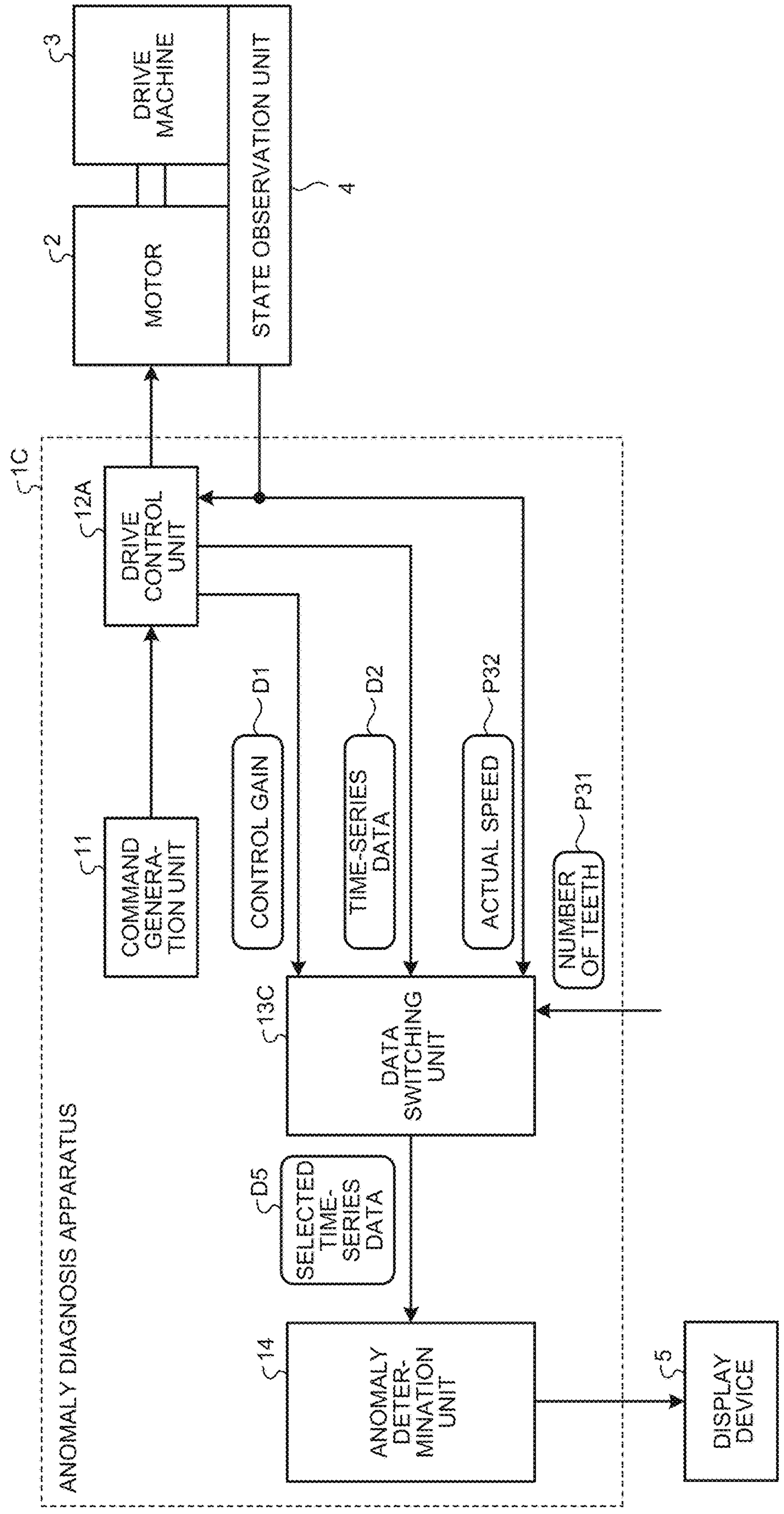
FIG. 9 is a diagram illustrating a configuration example of an anomaly diagnosis apparatus according to a third embodiment.

FIG. 9 is a diagram illustrating a configuration example of an anomaly diagnosis apparatus according to the third embodiment. Of the components in FIG. 9, components that achieve the same functions as those of the anomaly diagnosis apparatus 1A of the first embodiment illustrated in FIG. 1 are denoted by the same reference numerals without duplicated descriptions.

An anomaly diagnosis apparatus 1C of the third embodiment is different from the anomaly diagnosis apparatus 1A in that a data switching unit 13C is provided instead of the data switching unit 13. The data switching unit 13C and the data switching unit 13 are different in data input.

To the data switching unit 13C of the anomaly diagnosis apparatus 1C, the control gain D1, the time-series data D2, an actual speed P32 of the motor 2, and the number of teeth P31 on the drive machine 3 per revolution of the motor 2 are input. Specifically, to the data switching unit 13C, the control gain D1 and the time-series data D2 are input from the drive control unit 12A, and the actual speed P32 of the motor 2 is input from the state observation unit 4. The number of teeth P31 is input from an external device to the data switching unit 13C. The number of teeth P31 is the number of teeth on the drive machine 3 that rotate when the motor 2 makes one revolution. Note that the number of teeth P31 may be input to the data switching unit 13C by the user.

Figure 10:
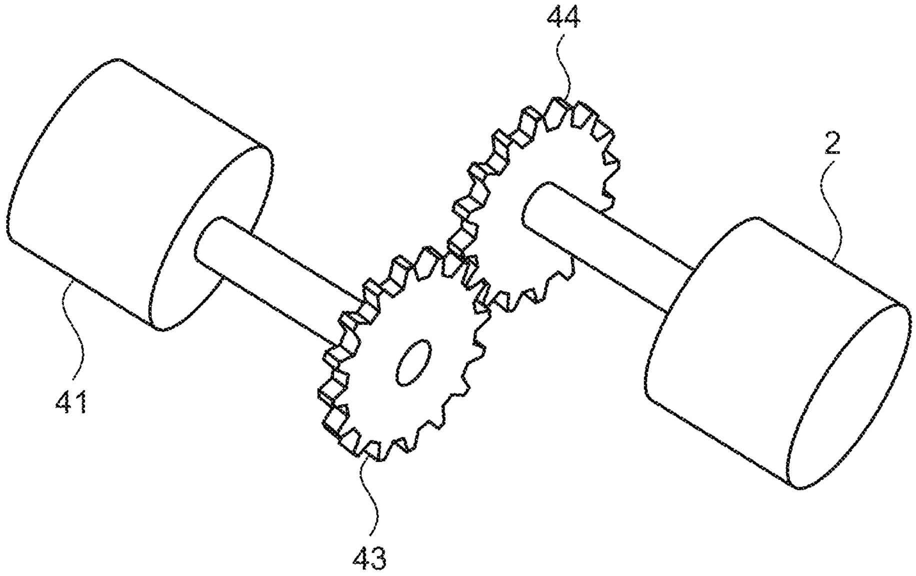
FIG. 10 is a diagram illustrating a configuration example of gears included in a drive machine on which anomaly diagnosis is performed by the anomaly diagnosis apparatus according to the third embodiment.

The third embodiment describes a case where the drive machine 3 illustrated in FIG. 9 is a drive machine including gears. FIG. 10 is a diagram illustrating a configuration example of the gears included in the drive machine on which anomaly diagnosis is performed by the anomaly diagnosis apparatus according to the third embodiment.

FIG. 10 illustrates spur gears as an example of the gears included in the drive machine 3. In the drive machine 3, the power of the motor 2 is transmitted to a load-side gear 43 via a drive-side gear 44, whereby a mechanical load 41 connected to the load-side gear 43 is driven.

Figure 11:
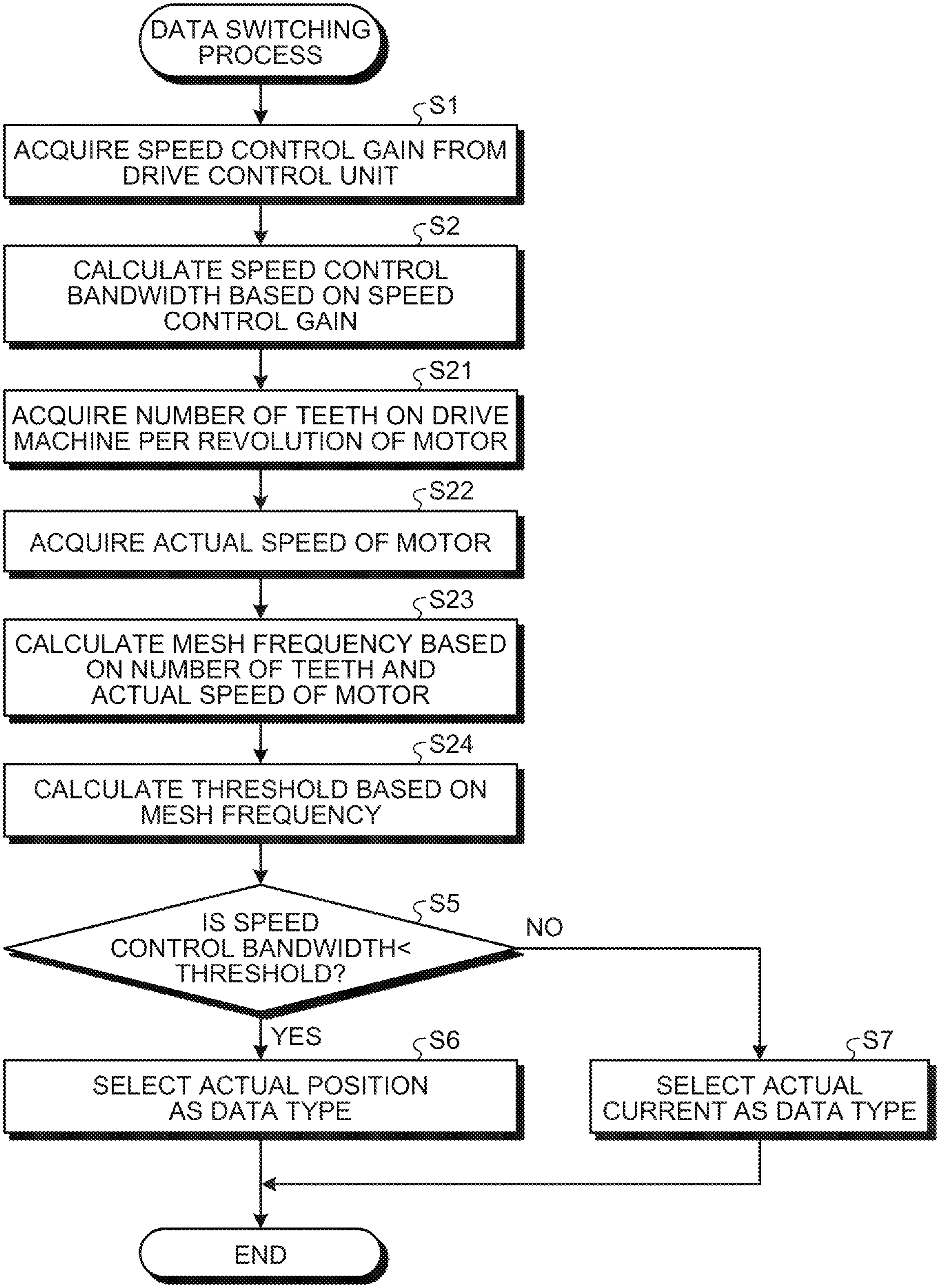
FIG. 11 is a flowchart illustrating a procedure of a process performed by a data switching unit included in the anomaly diagnosis apparatus according to the third embodiment.

Next, a detailed operation of the data switching unit 13C will be described. FIG. 11 is a flowchart illustrating a procedure of a process performed by the data switching unit included in the anomaly diagnosis apparatus according to the third embodiment. Of the processing illustrated in FIG. 11, the same processing as the processing performed by the anomaly diagnosis apparatus 1A of the first embodiment illustrated in FIG. 3 will not be described.

Compared with the anomaly diagnosis apparatus 1A, the anomaly diagnosis apparatus 1C of the third embodiment performs processing in steps S21 to S24 instead of steps S3 and S4. That is, the anomaly diagnosis apparatus 1C that has performed the processing in steps S1 and S2 performs the processing in steps S21 to S24, and then performs the processing in steps S5 to S7.

Specifically, the data switching unit 13C acquires the speed control gain P9 from the drive control unit 12A (step S1), and calculates the speed control bandwidth based on the speed control gain P9 (step S2).

Then, the data switching unit 13C acquires the number of teeth P31 on the drive machine 3 per revolution of the motor 2 (step S21). The number of teeth P31 is input to the data switching unit 13C in advance. The data switching unit 13C stores the input number of teeth P31, and acquires the number of teeth P31 by reading the stored number of teeth P31. For example, the drive-side gear 44 and the load-side gear 43 illustrated in FIG. 10 each have sixteen protrusions, and thus the number of teeth P31 is sixteen.

Next, the data switching unit 13C acquires the actual speed P32 of the motor 2 from the state observation unit 4 (step S22). Then, the data switching unit 13C calculates a mesh frequency based on the acquired number of teeth P31 and the acquired actual speed P32 of the motor 2 (step S23). The mesh frequency is a frequency indicating how many times teeth provided on mechanical parts collide with each other per unit time with the operation of the motor 2. For example, the mesh frequency of the drive-side gear 44 and the load-side gear 43 illustrated in FIG. 10 will be described. Since the spur gears illustrated in FIG. 10 have a gear ratio of 1:1, the mesh frequency fm [Hz] is obtained by formula (3) below, based on the actual speed P32 (=an actual speed $V_{fb}$ [r/min]) acquired in step S22 and the number of teeth P31 (=the number of teeth Z) acquired in step S21.

Formula 3

$$fm = \frac{V_{fb}}{60} * Z \tag{3}$$

Next, the data switching unit 13C calculates the threshold based on the calculated mesh frequency (step S24). Like the anomaly diagnosis apparatus 1A of the first embodiment, the anomaly diagnosis apparatus 1C sets, for example, the threshold=the mesh frequency, or the threshold=the mesh frequency×c, where c is in the range of about $0.5 \leq c \leq 2$. Then, the anomaly diagnosis apparatus 1C performs the processing in steps S5 to S7 like the anomaly diagnosis apparatus 1A.

Next, the effects of the third embodiment and the reason why the effects are achieved will be described. The anomaly diagnosis apparatus 1A of the first embodiment selects the data type to be output to the anomaly determination unit 14 (the selected time-series data D5), based on the result of a comparison between the threshold calculated from the resonance frequency D3 of the drive machine 3 and the speed control bandwidth determined from the speed control gain P9.

In contrast, when the drive machine 3 includes a power transmission mechanism using the meshing of mechanical parts, the anomaly diagnosis apparatus 1C of the third embodiment selects the data type to be output to the anomaly determination unit 14 (the selected time-series data D5), based on the result of a comparison between the threshold calculated from the mesh frequency of the drive machine 3 and the speed control bandwidth determined from the speed control gain P9.

In the drive machine 3 including mechanical parts that transmit power using meshing in the transmission mechanism, such as the drive-side gear 44 and the load-side gear 43, an excitation force generated at the time of collision between teeth tends to cause a disturbance associated with an anomaly in the mesh frequency or a frequency near the mesh frequency. Therefore, the anomaly diagnosis apparatus 1C calculates the mesh frequency, and the data switching unit 13C selects data that is advantageous for anomaly determination, based on the result of a comparison between the threshold calculated from the mesh frequency and the control bandwidth calculated from the speed control gain P9. Consequently, the anomaly diagnosis apparatus 1C can accurately detect anomalies even when the drive machine 3 includes mechanical parts that transmit power using meshing in the transmission mechanism, such as the drive-side gear 44 and the load-side gear 43.

Depending on the drive machine 3, a disturbance associated with an anomaly may occur not only in the mesh frequency but also in a frequency near the mesh frequency, such as a sideband wave. Therefore, as described above, the data switching unit 13C of the anomaly diagnosis apparatus 1C may set a value obtained by multiplying the mesh frequency by the specific constant c (e.g., about $0.5 \le c \le 2$) as the threshold determined from the drive machine 3.

Although the third embodiment has described the example in which when calculating the mesh frequency, the anomaly diagnosis apparatus 1C calculates the mesh frequency from the actual speed P32 (the actual speed=$V_{fb}$), the anomaly diagnosis apparatus 1C may calculate the mesh frequency from data other than the actual speed P32. For example, the anomaly diagnosis apparatus 1C may calculate speed information on the motor 2 based on a command speed obtained by differentiating the position command P1, and calculate the mesh frequency based on the speed information.

Although the third embodiment has described the case where the drive machine 3 includes spur gears as illustrated in FIG. 10, the drive machine 3 may be any drive machine that can calculate the mesh frequency. For example, the drive machine 3 may be a drive machine that can calculate the mesh frequency from the number of teeth P31 per revolution of the motor 2 and speed information on the motor 2, such as a drive machine including planetary gears or a drive machine including pulleys used for stretching a timing belt.

Here, a description has been given of the case where the numbers of teeth on the gears are the motor 2 side:the load side=Z:Z (1:1). However, even when the numbers of teeth on the gears are the motor 2 side:the load side=Z:Z1 (Z<Z1), the mesh frequency fm [Hz] is obtained by formula (3) described above. When the numbers of teeth on the gears are the motor 2 side:the load side=Z2:Z (Z2>Z), the data switching unit 13C can obtain the mesh frequency fm [Hz] by setting Z=Z2 in formula (3).

The third embodiment has described the case where an example of the transmission mechanism is gears, but the transmission mechanism is not limited to gears. For example, a wave gear device may be used as an example other than gears of the transmission mechanism.

Here, a description is given of a case where the transmission mechanism is a wave gear device. When the motor 2 drives a load via the wave gear device, it is known that vibration occurs in a frequency twice the motor speed, that is, a frequency fm2 [Hz] in formula (4) below because of the structure of the wave gear device. When an anomaly occurs in the transmission mechanism, an anomaly also occurs in the frequency fm2 [Hz] of formula (4). When the wave gear device is used as the transmission mechanism, a threshold is determined from formula (4), so that anomalies can be detected with high accuracy.

Formula 4

$$fm2 = \frac{V_{fb}}{60} * 2 \tag{4}$$

A rolling bearing may be used as the transmission mechanism. Rolling bearings are used in the motor 2 and also in the drive machine 3. Here, a description is given of a case where the transmission mechanism is a rolling bearing.

Figure 12:
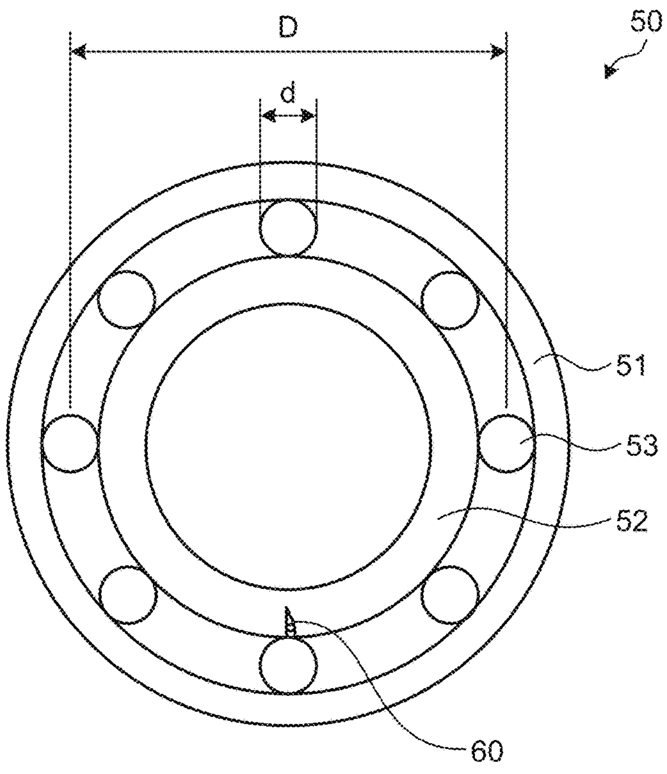
FIG. 12 is a diagram illustrating a configuration example of a rolling bearing on which anomaly diagnosis is performed by the anomaly diagnosis apparatus according to the third embodiment.
Figure 13:
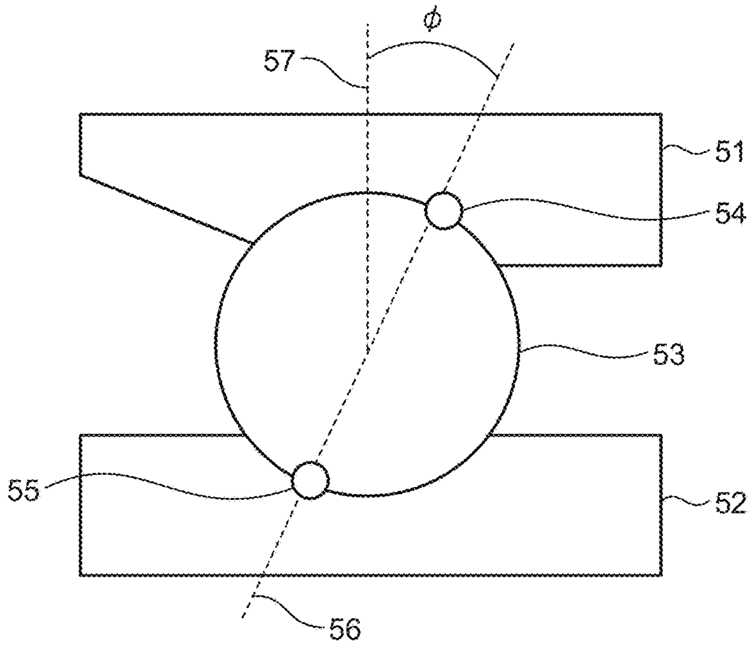
FIG. 13 is a diagram for explaining the contact angle of the rolling bearing illustrated in FIG. 12.

FIG. 12 is a diagram illustrating a configuration example of a rolling bearing on which anomaly diagnosis is performed by the anomaly diagnosis apparatus according to the third embodiment. FIG. 13 is a diagram for explaining the contact angle of the rolling bearing illustrated in FIG. 12.

A rolling bearing 50 includes an inner race 52, rolling elements 53, an outer race 51, a cage (not illustrated), and others. It is known that in the rolling bearing 50, a frequency in which an anomaly appears varies depending on a failed part (such as the inner race 52, the rolling elements 53, or the outer race 51) or a failure factor (such as flaking 60 or abrasion).

For example, when the flaking 60 occurs in the inner race 52 as illustrated in FIG. 12, an anomaly occurs in a frequency fm3 [Hz] of formula (5) below. In formula (5), n is the number of the rolling elements 53, d is the diameter of balls (the rolling elements 53), D is the pitch diameter, and Φ is the contact angle of the rolling bearing 50.

Formula 5

$$fm3 = n * \frac{V_{fb}}{60} * \left(1 + \frac{d}{D}\cos\phi\right) \tag{5}$$

The contact angle Φ is an angle formed by a line of action 56 in the rolling bearing 50 and a plane 57 perpendicular to the central axis of the rolling bearing 50. Each rolling element 53 is in contact with an outer bearing ring that is a bearing ring of the outer race 51 at one point 54, and is in contact with an inner bearing ring that is a bearing ring of the inner race 52 at one point 55. The line of action 56 of the load is a line connecting these two points 54 and 55. When the rolling bearing 50 is applied to the drive machine 3, the threshold is determined from formula (5), so that anomalies can be detected with high accuracy.

When the flaking 60 or another failure occurs in the rolling elements 53, the outer race 51, or others, the anomaly diagnosis apparatus 1C may also calculate a frequency in which an anomaly occurs, using a known mathematical formula, to determine the threshold. When another failure factor occurs, the anomaly diagnosis apparatus 1C may also calculate a frequency in which an anomaly occurs, using a known mathematical formula, to determine the threshold.

Furthermore, the transmission mechanism may be a transmission mechanism combining gears, a wave gear device, the rolling bearing 50, a belt, etc. Even when a type of combination of the transmission mechanism is different, what is in common with the gears, the wave gear device, the rolling bearing 50, etc. described above is vibration proportional to the speed of the motor 2 because of the structure. That is, even when the transmission mechanism is of a different type or combination, vibration proportional to the rotational frequency of the motor 2 is likely to occur. When an anomaly occurs, vibration proportional to the speed of the motor 2 also occurs. In this case, as the threshold, a value proportional to a frequency calculated from the speed information on the motor 2 is selected as the threshold, so that anomalies can be detected with high accuracy.

As described above, according to the third embodiment, the anomaly diagnosis apparatus 1C selects the data type to be output to the anomaly determination unit 14, based on the result of a comparison between the threshold calculated from the mesh frequency of the drive machine 3 and the speed control bandwidth determined from the speed control gain P9. Consequently, the anomaly diagnosis apparatus 1C can perform anomaly diagnosis easily with high accuracy as in the first embodiment.

Fourth Embodiment

Next, a fourth embodiment will be described with reference to FIGS. 14 and 15. The first embodiment has described the example of selecting data advantageous for anomaly determination, using the threshold determined from the resonance frequency D3 of the drive machine 3, when some anomaly occurs in the drive machine 3. In the fourth embodiment, when the actual current P10 is selected in the first embodiment, data advantageous for anomaly determination is reselected based on the drive state of the motor 2.

Figure 14:
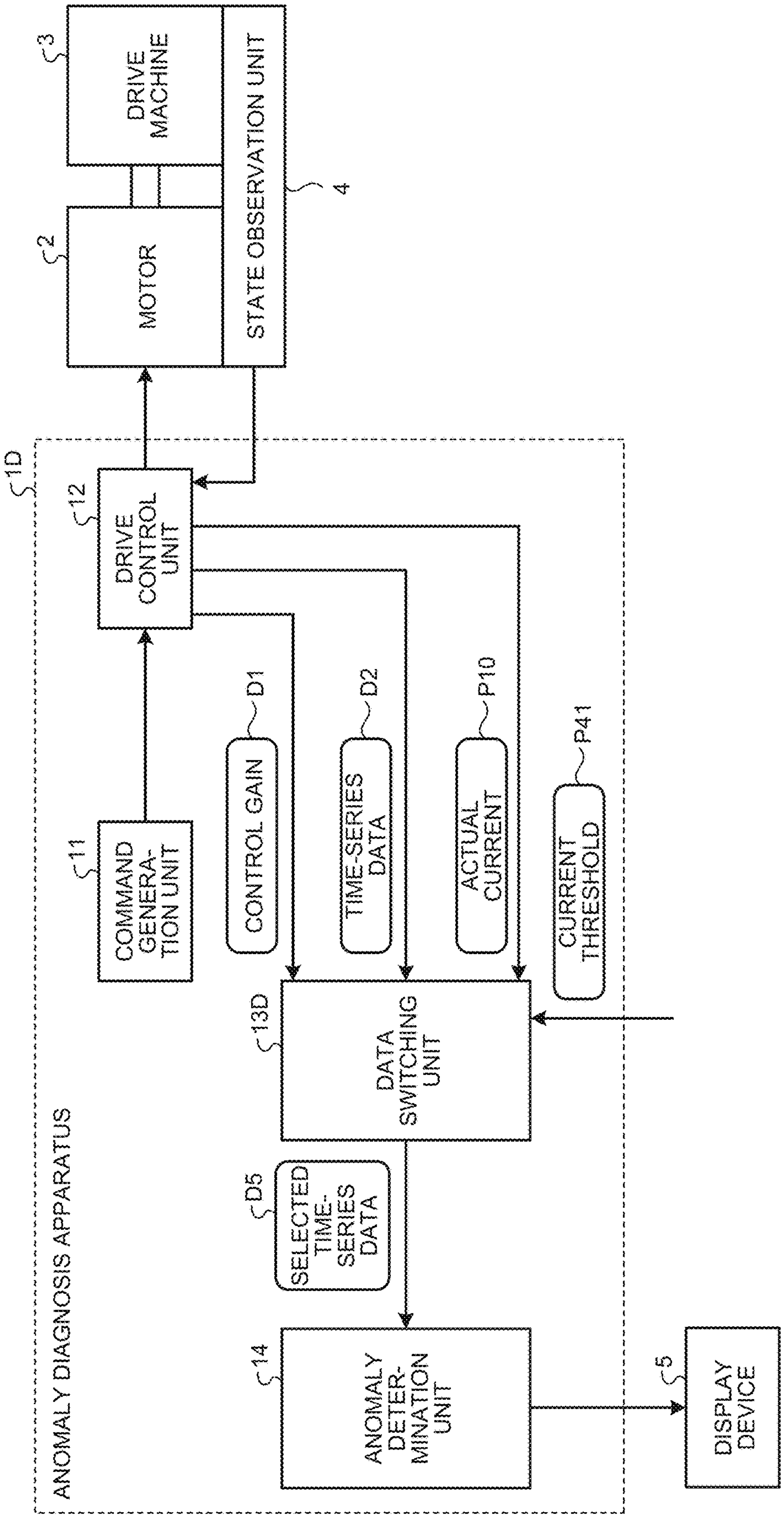
FIG. 14 is a diagram illustrating a configuration example of an anomaly diagnosis apparatus according to a fourth embodiment.
Figure 15:
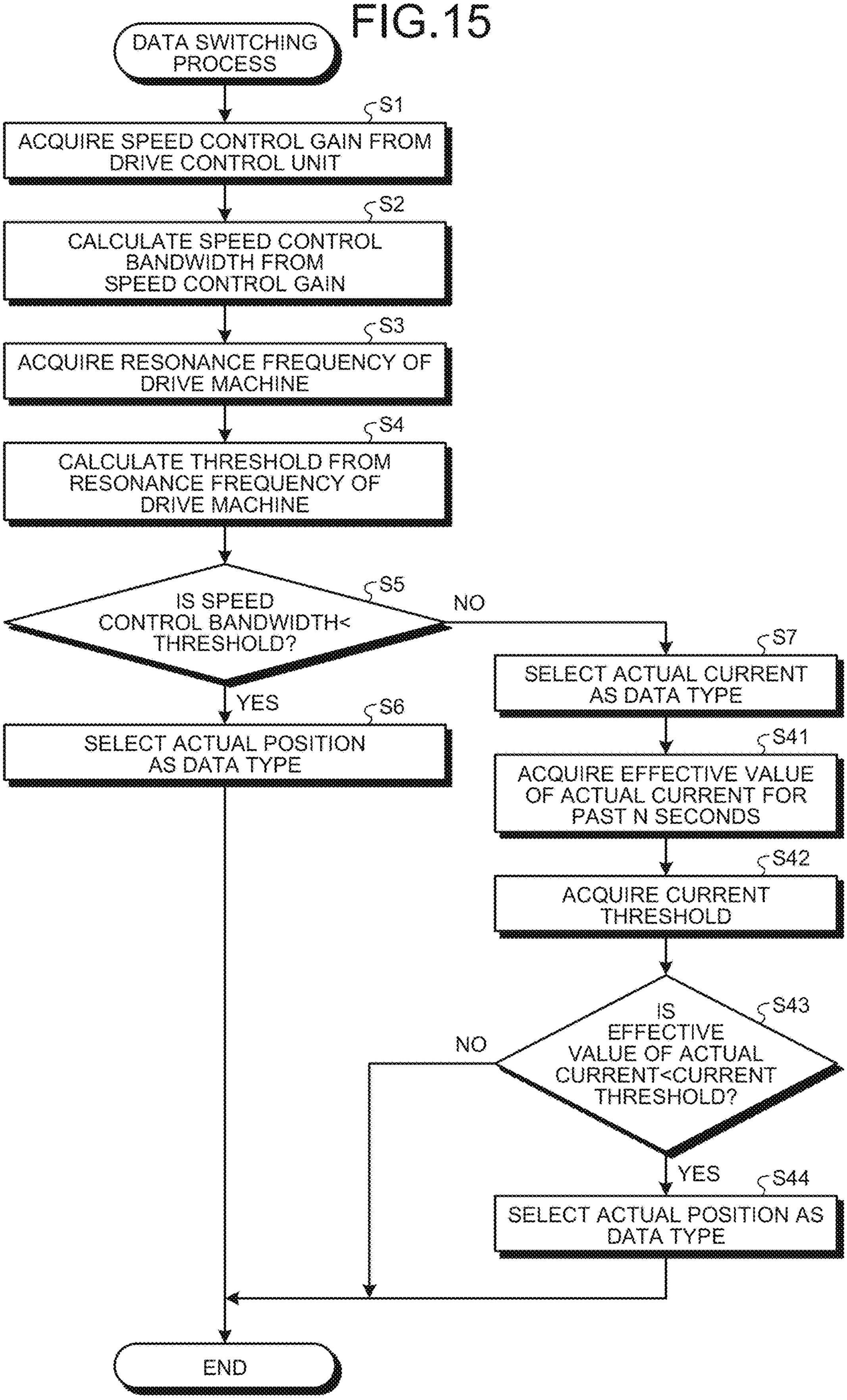
FIG. 15 is a flowchart illustrating a procedure of a process performed by a data switching unit included in the anomaly diagnosis apparatus according to the fourth embodiment.

FIG. 14 is a diagram illustrating a configuration example of an anomaly diagnosis apparatus according to the fourth embodiment. Of the components in FIG. 14, components that achieve the same functions as those of the anomaly diagnosis apparatus 1A of the first embodiment illustrated in FIG. 1 are denoted by the same reference numerals without duplicated descriptions.

An anomaly diagnosis apparatus 1D of the fourth embodiment is different from the anomaly diagnosis apparatus 1A in that a data switching unit 13D is provided instead of the data switching unit 13. The data switching unit 13D and the data switching unit 13 are different in data input.

To the data switching unit 13D of the anomaly diagnosis apparatus 1D, the control gain D1, the time-series data D2, the actual current P10 corresponding to the drive current P7 of the motor 2, and a current threshold P41 are input. Specifically, to the data switching unit 13D, the control gain D1, the time-series data D2, and the actual current P10 are input from the drive control unit 12, and the current threshold P41 is input by the user. The actual current P10 may be input from the state observation unit 4 to the data switching unit 13D. The current threshold P41 is a threshold for the effective value of the actual current P10. The current threshold P41 is used to determine whether or not to change the data type to be selected (an object of selection) from the actual current P10 to the actual position P11.

Next, a detailed operation of the data switching unit 13D will be described. FIG. 15 is a flowchart illustrating a procedure of a process performed by the data switching unit included in the anomaly diagnosis apparatus according to the fourth embodiment. Of the processing illustrated in FIG. 15, the same processing as the processing performed by the anomaly diagnosis apparatus 1A of the first embodiment illustrated in FIG. 3 will not be described.

Compared with the anomaly diagnosis apparatus 1A, the anomaly diagnosis apparatus 1D of the fourth embodiment performs processing in steps S41 to S44 after step S7. The anomaly diagnosis apparatus 1D performs the same processing in steps S1 to S7 as the anomaly diagnosis apparatus 1A.

The anomaly diagnosis apparatus 1D that has performed the processing in steps S1 to S7 performs the processing in steps S41 to S44. That is, when the speed control bandwidth is higher than the threshold, the data switching unit 13D selects the actual current P10 as the data type, and then performs the processing in steps S41 to S44.

Specifically, after selecting the actual current P10 as the data type, the data switching unit 13D acquires the effective value of the actual current P10 for the past N seconds from the drive control unit 12A (step S41). Here, N is a real number greater than 0.

Next, the data switching unit 13D acquires the current threshold P41 (step S42). The user sets the current threshold P41 in the data switching unit 13D in advance. The data switching unit 13D stores the current threshold P41 set by the user in advance, and acquires the current threshold P41 by reading the stored current threshold P41.

Then, the data switching unit 13D compares the acquired effective value of the actual current P10 with the acquired current threshold P41, and determines whether or not the effective value of the actual current P10<the current threshold P41 (step S43). That is, the data switching unit 13D determines whether or not the effective value of the actual current P10 is lower than the current threshold P41.

When determining that the effective value of the actual current P10 is lower than the current threshold P41 (step S43, Yes), the data switching unit 13D selects the actual position P11 as the data type (step S44) and outputs the actual position P11 to the anomaly determination unit 14. That is, when the effective value of the actual current P10 is lower than the current threshold P41, the data switching unit 13D changes the data type to be selected from the actual current P10 to the actual position P11.

On the other hand, when determining that the effective value of the actual current P10 is higher than the current threshold P41 (step S43, No), the data switching unit 13D outputs the actual current P10 selected in step S7 directly to the anomaly determination unit 14 without reselecting the data type.

When determining that the effective value of the actual current P10 and the current threshold P41 are the same, the data switching unit 13D may select the actual position P11 as the data type, or may not reselect the data type.

Here, a description has been given of the example in which the selected data is the actual current P10 or the actual position P11, but the selected actual current P10 may be any data included in the first data group. That is, the selected actual current P10 may be replaced with the current command P5, the torque command P12, the actual torque P13, the disturbance torque estimate value P14, the current deviation P6, or the torque deviation.

The actual position P11 may be any data included in the second data group. That is, the selected actual position P11 may be replaced with the speed command P3, the actual speed P8, the acceleration, the position deviation P2, or the speed deviation P4.

At least one piece of data included in the first data group is current-related information related to the actual current P10. When determining whether or not to perform the reselection of the data type, based on the current-related information, the data switching unit 13D determines whether or not the effective value of the current-related information detected for a past specific time is lower than a performance threshold that is a threshold for the effective value.

When the effective value of the current-related information is lower than the performance threshold, the data switching unit 13D selects at least one piece of data included in the second data group as the data type, and outputs the selected piece of data to the anomaly determination unit 14. On the other hand, when the effective value of the current-related information is higher than the performance threshold, the data switching unit 13D does not reselect the data type, and outputs at least one piece of data included in the first data group selected in step S7 directly to the anomaly determination unit 14.

Next, the effects of the fourth embodiment and the reason why the effects are achieved will be described. The anomaly diagnosis apparatus 1A of the first embodiment selects the data type to be output to the anomaly determination unit 14 (the selected time-series data D5), based on the result of a comparison between the threshold calculated from the resonance frequency D3 of the drive machine 3 and the speed control bandwidth determined from the speed control gain P9.

In contrast, when the actual current P10 is selected as the data type, the anomaly diagnosis apparatus 1D of the fourth embodiment compares the drive state of the motor 2, that is, the effective value of the actual current P10 with the current threshold P41 determined by the user. Then, the anomaly diagnosis apparatus 1D reselects the data type to be used for anomaly determination, based on the comparison result. For example, when the friction of the drive machine 3 is small, and the speed of the motor 2 needs to be maintained at a constant speed, the motor 2 does not have acceleration operation and deceleration operation, so that the actual current P10 required to operate is small.

When the actual current P10 required to operate is somewhat large, a disturbance associated with an anomaly is also somewhat likely to appear in the actual current P10. When the actual current P10 required to operate is small to some extent, a disturbance itself associated with an anomaly is also extremely small. Thus, in a situation where the actual current P10 is extremely small, using the actual current P10 for anomaly determination can affect the accuracy of the anomaly determination. Therefore, when the actual current P10 is small to some extent, it is more advantageous to use the actual position P11 instead of the actual current P10 to perform anomaly determination. That is, even when the anomaly diagnosis apparatus 1D has selected the actual current P10 in step S7, if the effective value of the actual current P10 is lower than the current threshold P41, it is more advantageous for anomaly determination to select the actual position P11 to perform anomaly diagnosis.

Depending on the operating pattern of the motor 2 or the drive machine 3, the actual current P10 may become momentarily small. Therefore, the anomaly diagnosis apparatus 1D acquires the effective value of the actual current P10 for the past N seconds in advance. Then, the anomaly diagnosis apparatus 1D determines whether or not the acquired effective value of the actual current P10 is lower than the current threshold P41, and selects the actual position P11 as the data type when the effective value of the actual current P10 is lower than the current threshold P41. As described above, even when the drive machine 3 operates with the actual current P10 of the motor 2 being small, the anomaly diagnosis apparatus 1D reselects the data type to automatically select data advantageous for anomaly determination, thereby being able to perform anomaly diagnosis on the drive machine 3.

As described above, according to the fourth embodiment, when the effective value of the actual current P10 is lower than the current threshold P41, the anomaly diagnosis apparatus 1D selects the actual position P11 as the data type and performs anomaly diagnosis, and thus can perform anomaly diagnosis with higher accuracy than in the first embodiment.

Here, a hardware configuration of the anomaly diagnosis apparatuses 1A to 1D will be described. The anomaly diagnosis apparatuses 1A to 1D have the same hardware configuration, and thus the hardware configuration of the anomaly diagnosis apparatus 1A will be described here.

Figure 16:
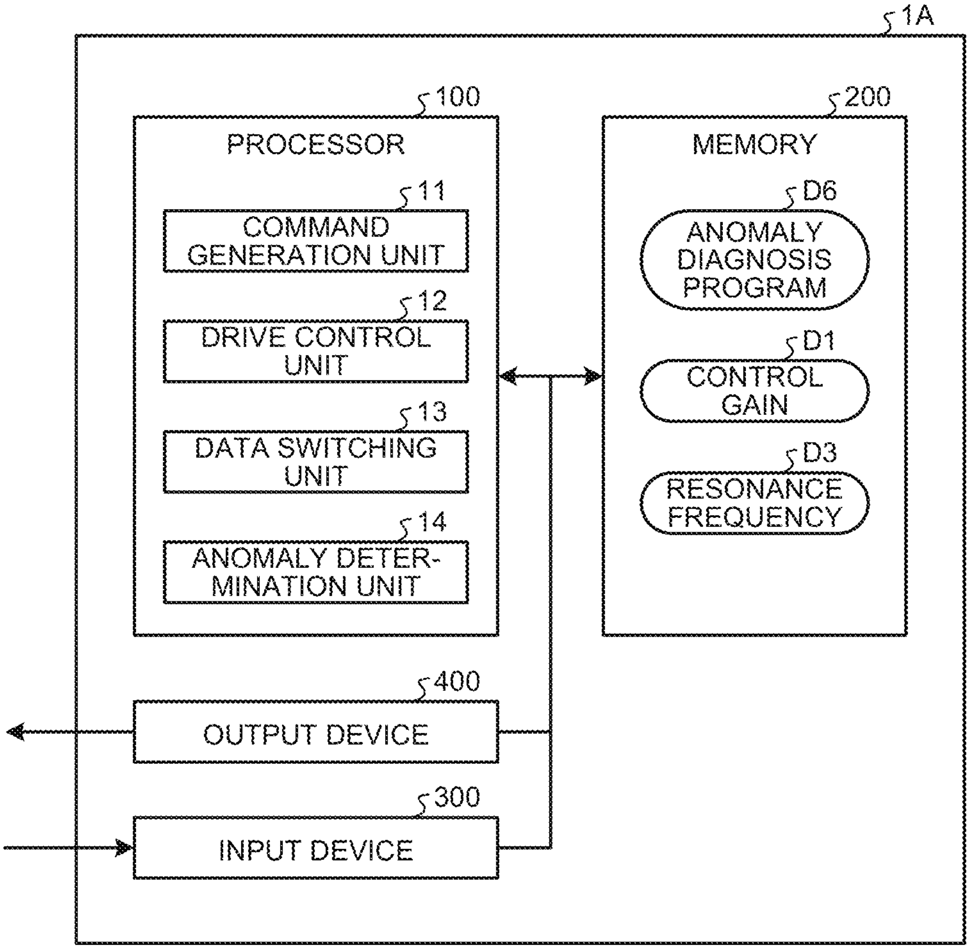
FIG. 16 is a diagram illustrating an example of a hardware configuration for implementing the anomaly diagnosis apparatus according to the first embodiment.

FIG. 16 is a diagram illustrating an example of a hardware configuration for implementing the anomaly diagnosis apparatus according to the first embodiment. The anomaly diagnosis apparatus 1A can be implemented by an input device 300, a processor 100, memory 200, and an output device 400. An example of the processor 100 is a central processing unit (CPU, also called a central processor, a processing device, an arithmetic device, a microprocessor, a microcomputer, or a digital signal processor (DSP)), or a system large-scale integration (LSI). Examples of the memory 200 are random-access memory (RAM) and read-only memory (ROM).

The anomaly diagnosis apparatus 1A is implemented by the processor 100 reading and executing a computer-executable anomaly diagnosis program D6 for performing the operation of the anomaly diagnosis apparatus 1A stored in the memory 200. The anomaly diagnosis program D6, which is a program for performing the operation of the anomaly diagnosis apparatus 1A, can be said to cause a computer to perform the procedure or method in the anomaly diagnosis apparatus 1A.

The anomaly diagnosis program D6 executed by the anomaly diagnosis apparatus 1A has a module configuration including the command generation unit 11, the drive control unit 12, the data switching unit 13, and the anomaly determination unit 14, and these are loaded on a main storage device and generated on the main storage device.

The input device 300 receives the time-series data D2 on the motor 2 or the drive machine 3 from the state observation unit 4, and transmits the time-series data D2 to the processor 100. The memory 200 stores the anomaly diagnosis program D6, the control gain D1, the resonance frequency D3 of the drive machine 3, etc.

The control gain D1, the resonance frequency D3 of the drive machine 3, etc. are read from the memory 200 by the processor 100. The memory 200 is also used as temporary memory when the processor 100 performs various types of processing. The output device 400 outputs a determination object of anomaly determination, a determination item, and a determination result to an external device such as the display device 5.

The anomaly diagnosis program D6 may be stored in a computer-readable storage medium in an installable-format or executable-format file and provided as a computer program product. Alternatively, the anomaly diagnosis program D6 may be provided to the anomaly diagnosis apparatus 1A via a network such as the Internet. The functions of the anomaly diagnosis apparatus 1A may be partly implemented by dedicated hardware such as a dedicated circuit and partly implemented by software or firmware.

The configurations described in the above embodiments illustrate an example, and can be combined with another known art. The embodiments can be combined with each other. The configurations can be partly omitted or changed without departing from the gist.

REFERENCE SIGNS LIST

1A to 1D anomaly diagnosis apparatus; 2 motor; 3 drive machine; 4 state observation unit; 5 display device; 11 command generation unit; 12A, 12B drive control unit; 13, 13C, 13D data switching unit; 14 anomaly determination unit; 15 operation determination unit; 21 to 24 subtracter; 41 mechanical load; 43 load-side gear; 44 drive-side gear; 50 rolling bearing; 51 outer race; 52 inner race; 53 rolling element; 54, 55 point; 56 line of action; 57 plane; 60 flaking; 100 processor; 121 position control unit; 122 speed control unit; 123 current control unit; 124 speed conversion unit; 125 disturbance observer; 200 memory; 300 input device; 400 output device; D1 control gain; D2 time-series data; D3 resonance frequency; D5 selected time-series data; D6 anomaly diagnosis program; P1 position command; P2 position deviation; P3 speed command; P4 speed deviation; P5 current command; P6 current deviation; P7 drive current; P8, P8*x*, P32 actual speed; P9 speed control gain; P10 actual current; P11 actual position; P12 torque command; P13 actual torque; P14 disturbance torque estimate value; P21 command speed; P22 operation information; P31 number of teeth; P41 current threshold.

The invention claimed is:

1. An anomaly diagnosis apparatus, comprising:

a processor; and a memory to store a program which, when executed by the processor, performs processes of:

generating a command value to specify an operation of a motor or a drive machine driven by the motor;

performing feedback control on the motor based on a control gain so that the operation of the motor or the drive machine follows the command value;

switching selected time-series data by selecting data from time-series data indicating a state of the motor or the drive machine, based on a result of a comparison between a control bandwidth determined from the control gain and a threshold calculated based on a resonance frequency of the drive machine; and determining an anomalous state of the motor or the drive machine, based on the selected time-series data.

2. The anomaly diagnosis apparatus according to claim 1, wherein the processor selects the selected time-series data from a first data group of the time-series data when the control bandwidth is higher than the threshold, and selects the selected time-series data from a second data group of the time-series data when the control bandwidth is lower than the threshold, the first data group includes a current command for driving the motor, a torque command for driving the motor or the drive machine, an actual current detected from the motor, an actual torque detected from the motor or the drive machine, a disturbance torque estimate value that is an estimate value of a disturbance torque on the motor or the drive machine, a current deviation that is a difference between the current command and the actual current, and a torque deviation that is a difference between the torque command and the actual torque, and the second data group includes an actual position of the motor or the drive machine, a speed command to the motor or the drive machine, an actual speed of the motor or the drive machine, an acceleration of the motor or the drive machine, a position deviation that is a difference between a position command corresponding to the actual position and the actual position, and a speed deviation that is a difference between the speed command and the actual speed.

3. The anomaly diagnosis apparatus according to claim 2, wherein the processor changes an object of selection by selecting the selected time-series data from the second data group of the time-series data, when the control bandwidth is higher than the threshold and an effective value of current-related information related to the actual current detected from the motor for a past specific time is lower than a performance threshold that is a threshold for the effective value.

4. The anomaly diagnosis apparatus according to claim 1, further comprising the processor determines whether or not the time-series data corresponds to an acceleration section or a deceleration section of the motor or the drive machine, based on the command value, and outputs a determination result as operation information, wherein the processor selects, from the time-series data, data including at least one of the acceleration section and the deceleration section of the selected time-series data, based on the operation information.

5. The anomaly diagnosis apparatus according to claim 1, further comprising the processor determines whether or not the time-series data corresponds to a constant speed section of the motor or the drive machine, based on the command value, and sets a determination result as operation information, wherein the processor selects, from the time-series data, data including the constant speed section of the selected time-series data, based on the operation information.

6. The anomaly diagnosis apparatus according to claim 1, further comprising the processor determines whether or not the time-series data corresponds to a stop section of the motor or the drive machine, based on the command value, wherein selects, from the time-series data, data including the stop section of the selected time-series data, based on the operation information.

7. The anomaly diagnosis apparatus according to claim 1, wherein when the drive machine includes mechanical parts to transmit power using meshing of teeth, the threshold is a value calculated based on a mesh frequency that is calculated using speed information on the motor and the number of teeth on the mechanical parts.

8. The anomaly diagnosis apparatus according to claim 1, wherein the threshold is a value proportional to a frequency calculated from speed information on the motor.

9. The anomaly diagnosis apparatus according to claim 1, wherein the time-series data includes at least one of first data acquired by observing the state of the motor or the drive machine, second data generated in the feedback control, and third data generated in the generating the command value.

10. The anomaly diagnosis apparatus according to claim 9, wherein the time-series data includes data obtained by performing at least one of four arithmetic operations, an integration operation, differential processing, and filtering on at least one of the first data, the second data, and the third data.

11. The anomaly diagnosis apparatus according to claim 1, wherein the processor determines the anomalous state of the motor or the drive machine, using unsupervised learning, supervised learning, or reinforcement learning.

12. An anomaly diagnosis method by an anomaly diagnosis apparatus to perform diagnosis on an operation of a motor or a drive machine driven by the motor, comprising:

generating a command value to specify the operation of the motor or the drive machine;

performing feedback control on the motor based on a control gain so that the operation of the motor or the drive machine follows the command value;

switching selected time-series data by selecting data from time-series data indicating a state of the motor or the drive machine, based on a result of a comparison between a control bandwidth determined from the control gain and a threshold calculated based on a resonance frequency of the drive machine; and determining an anomalous state of the motor or the drive machine, based on the selected time-series data.

13. The anomaly diagnosis method according to claim 12, wherein in the data switching, the selected time-series data to be output is selected from a first data group of the time-series data when the control bandwidth is higher than the threshold, and the selected time-series data to be output is selected from a second data group of the time-series data when the control bandwidth is lower than the threshold, the first data group includes a current command for driving the motor, a torque command for driving the motor or the drive machine, an actual current detected from the motor, an actual torque detected from the motor or the drive machine, a disturbance torque estimate value that is an estimate value of a disturbance torque on the motor or the drive machine, a current deviation that is a difference between the current command and the actual current, and a torque deviation that is a difference between the torque command and the actual torque, and the second data group includes an actual position of the motor or the drive machine, a speed command to the motor or the drive machine, an actual speed of the motor or the drive machine, an acceleration of the motor or the drive machine, a position deviation that is a difference between a position command corresponding to the actual position and the actual position, and a speed deviation that is a difference between the speed command and the actual speed.

* * * * *